United States Patent
Wuerfel et al.

(10) Patent No.: US 10,773,356 B2
(45) Date of Patent: Sep. 15, 2020

(54) METHOD OF PRODUCING A WORKPIECE HAVING A MODIFIED GEARING GEOMETRY

(71) Applicant: Liebherr-Verzahntechnik GmbH, Kempten/Allgaeu (DE)

(72) Inventors: Robert Wuerfel, Kempten (DE); Hansjoerg Geiser, Wiggensbach (DE)

(73) Assignee: LIEBHERR-VERZAHNTECHNIK GMBH, Kempten/Allgaeu (DE)

( * ) Notice: Subject to any disclaimer, the term of this patent is extended or adjusted under 35 U.S.C. 154(b) by 627 days.

(21) Appl. No.: 15/273,623

(22) Filed: Sep. 22, 2016

(65) Prior Publication Data
US 2017/0080546 A1    Mar. 23, 2017

(30) Foreign Application Priority Data

Sep. 23, 2015 (DE) .......................... 10 2015 012 308
Aug. 10, 2016 (EP) ...................................... 16183528

(51) Int. Cl.
*B24B 51/00* (2006.01)
*B23F 5/04* (2006.01)
(Continued)

(52) U.S. Cl.
CPC .............. *B24B 51/00* (2013.01); *B23F 5/04* (2013.01); *B23F 19/002* (2013.01);
(Continued)

(58) Field of Classification Search
None
See application file for complete search history.

(56) References Cited

U.S. PATENT DOCUMENTS 4,571,891 A * 2/1986 Donner .................... B24B 49/18
                                                125/11.17
4,811,528 A * 3/1989 Sommer ................... B23F 5/00
                                                409/13
(Continued)

FOREIGN PATENT DOCUMENTS

DE     19624842 A1    1/1998
DE     19706867 A1    8/1998
(Continued)

OTHER PUBLICATIONS

Wuerfel, Robert, "Method of Producing a Toothed Workpiece Having a Modified Surface Geometry," U.S. Appl. No. 15/207,339, filed Jul. 11, 2016, 191 pages.
(Continued)

*Primary Examiner* — Mohammad Ali
*Assistant Examiner* — Vincent W Chang
(74) *Attorney, Agent, or Firm* — McCoy Russell LLP

(57) ABSTRACT

A method of producing a workpiece having a modified gearing geometry by a generating method includes generating machining the workpiece in at least one machining stroke with a tool having a modified gearing geometry and a topological modification. Provision is made that the contact path with the workpiece is not shifted on the tool during the machining stroke. In one example, a cylindrical workpiece is machined by an axial generating method. In another example, a conical workpiece is machined by a diagonal generating method, and the diagonal ratio is selected such that the contact path does not shift on the tool during the machining stroke.

27 Claims, 9 Drawing Sheets

(51) Int. Cl.
*B23F 19/00* (2006.01)
*B23F 23/12* (2006.01)
*G05B 19/042* (2006.01)
*G05B 19/402* (2006.01)

(52) U.S. Cl.
CPC ...... *B23F 23/1225* (2013.01); *G05B 19/0426* (2013.01); *G05B 19/402* (2013.01); *G05B 2219/35035* (2013.01); *G05B 2219/36196* (2013.01)

(56) References Cited

U.S. PATENT DOCUMENTS

| | | | |
|---|---|---|---|
| 6,422,924 B1 * | 7/2002 | Faulstich | B23F 19/007 451/147 |
| 6,491,568 B1 * | 12/2002 | Jankowski | B24B 53/075 451/253 |
| 2004/0005843 A1 * | 1/2004 | Breitschaft | B23F 23/1231 451/47 |
| 2013/0171912 A1 * | 7/2013 | Radev | B23F 19/002 451/5 |
| 2013/0280990 A1 | 10/2013 | Geiser et al. | |
| 2016/0214197 A1 | 7/2016 | Wuerfel | |

FOREIGN PATENT DOCUMENTS

| | | |
|---|---|---|
| DE | 10131060 A1 | 1/2003 |
| DE | 10208531 A1 | 9/2003 |
| DE | 202005014619 U1 | 12/2005 |
| DE | 102005030846 A1 | 2/2006 |
| DE | 102012015846 A1 | 10/2013 |
| DE | 102013015232 A1 | 3/2015 |
| DE | 102015000907 A1 | 7/2016 |
| EP | 1995010 A1 | 11/2008 |
| WO | 2010060596 A1 | 6/2010 |

OTHER PUBLICATIONS

Wuerfel, Robert, "Method of Producing a Toothed Workpiece Having a Modified Surface Geometry," U.S. Appl. No. 15/207,350, filed Jul. 11, 2016, 195 pages.
Wuerfel, Robert, "Method of Producing a Toothed Workpiece Having a Modified Surface Geometry," U.S. Appl. No. 15/207,424, filed Jul. 11, 2016, 186 pages.
Wuerfel, Robert, "Method of Dressing a Tool," U.S. Appl. No. 15/207,450, filed Jul. 11, 2016, 189 pages.
Wuerfel, Robert, "Method of Producing a Toothed Workpiece Having a Desired Gear Geometry," U.S. Appl. No. 15/207,454, filed Jul. 11, 2016, 183 pages.
Wuerfel, Robert, "Method of Producing One or More Workpieces," U.S. Appl. No. 15/207,442, filed Jul. 11, 2016, 176 pages.
Wuerfel, Robert, "Method of Dressing a Tool," U.S. Appl. No. 15/207,461, filed Jul. 11, 2016, 193 pages.

* cited by examiner

METHOD OF PRODUCING A WORKPIECE HAVING A MODIFIED GEARING GEOMETRY

CROSS REFERENCE TO RELATED APPLICATIONS

This application claims priority to German Patent Application No. 10 2015 012 308.4, entitled "Method of Producing a Workpiece Having a Modified Gearing Geometry," filed Sep. 23, 2015; and to European Patent Application No. 16183528.5, filed Aug. 10, 2016.

TECHNICAL FIELD

The present disclosure relates to a method of producing a workpiece having a modified gearing geometry by a generating method, wherein the workpiece is generating machined in at least one machining stroke by means a tool having a modified gearing geometry, with the tool having a topological modification. The generating method can in particular be a generating grinding method. The tool can furthermore in particular be a grinding worm.

BACKGROUND AND SUMMARY

Topologically modified tools were used, for example, in DE 102012015846A1, EP 1995010A1, WO 2010/060596A1, DE 19624842A1, DE 19706867, DE 102005030846A1 and DE 102006061759A1 to produce a corresponding topological modification on the workpiece by way of a diagonal generating method. The diagonal ratio was selected for this purpose such that the contact path with the workpiece sweeps over a defined region of the tool in which the topological modification is applied during a machining stroke so that the topological modification is applied to the workpiece.

Profile modifications were in contrast typically implemented in accordance with the prior art in that the tool is dressed using a dresser which provides the desired modification of the profile shape and transfers it to the tool during dressing. In generating machining, the modification is then transferred to the workpiece.

However, this has the disadvantage that a corresponding dresser has to be produced for each desired profile modification. The cost and time effort associated herewith is not worthwhile in every situation in this respect.

Alternatively, the desired profile shape on the tool can also be produced by contour dressing. The contour dressing is, however, very time-intensive and additionally produces an unwanted surface roughness in many cases.

It is there for the object of the present disclosure to provide an improved method for producing a workpiece having a modified gearing geometry.

The present disclosure comprises a method of producing a workpiece having a modified gearing geometry by a generating method, wherein the workpiece is generating machined in at least one machining stroke by a tool having a modified gearing geometry, with the tool having a topological modification. The method in accordance with the present disclosure is characterized in that the contact path with the workpiece is not shifted on the tool during the machining stroke.

The inventor of the present disclosure has recognized that topologically modified tools can also be used to produce a profile modification of the workpiece machined by the generating method. A method is hereby provided which can be realized inexpensively and fast and by which profile modifications can also be produced on a workpiece without a correspondingly modified dresser and without the use of a contour dressing process. This is achieved in that, unlike with the use of topologically modified tools known from the prior art, the contact path is no longer shifted over a defined region of the tool, but rather remains unchanged over the machining stroke. The total width of the workpiece is thus machined with the same contact path of the tool. As a result, no topological modification results on the workpiece, despite the topologically modified tool; rather, a profile modification results.

The present disclosure is optionally used for producing gear wheels with a gearing of a spur gear. The workpieces can furthermore have both a cylindrical and a conical basic shape.

In a first embodiment of the present disclosure, the method in accordance with the present disclosure is used for machining a cylindrical workpiece. In this case, the machining of the workpiece optionally takes place by an axial generating method, e.g. without a shifting of the tool along its axis of rotation during the machining stroke. It is ensured by the axial generating method that the contact path on the tool is not shifted during the machining stroke.

In a second embodiment of the present disclosure, the method in accordance with the present disclosure is used for machining a conical workpiece. In this case, the machining of the workpiece optionally takes place by a diagonal generating method, wherein the diagonal ratio is selected such that the contact path on the tool does not shift during the machining stroke. Unlike in the machining of a cylindrical workpiece, an axial generating method in the machining of a conical workpiece would result in a shift of the contact path on the tool. The machining of conical workpieces in accordance with the method in accordance with the present disclosure therefore requires the use of a diagonal generating method to ensure by a corresponding shifting of the tool along its axis of rotation during the machining stroke that the contact path does not shift.

In a first variant, a tool having a cylindrical basic shape is used. In this case, the machining optionally takes place at one flank. This is due to the fact that different diagonal ratios are generally necessary for the left and right flanks so that the contact path is not shifted. A two-flank machining of the workpiece is therefore generally no longer possible.

In a second variant, a tool having a conical basic shape is used in contrast. A further degree of freedom is available with the conical angle due to the use of a conical tool and said degree of freedom can be selected such that a two-flank machining in accordance with the method in accordance with the present disclosure becomes possible. On the use of a tool having a conical basic shape, the machining of the workpiece therefore optionally takes place on two flanks, with the conical angle of the tool and the diagonal ratio further optionally being selected such that the contact path does not shift on the right and left flanks in the two-flank machining.

Embodiments of the present disclosure which can be used both for machining cylindrical workpieces and for machining conical workpieces will be described in the following.

A topological modification of the tool means that the tool has a combination of a profile modification and a tooth trace modification.

In accordance with a first embodiment of the present disclosure, the topological modification of the surface geometry of the tool can have a constant value in the generating pattern at least locally in a first direction of the tool and can be given by a function $F_{Ft1}$ in a second direction of the tool which extends perpendicular to the first direction. The topological modification is optionally also globally given in this manner in at least one region of the tool. Such topological modifications can be applied relatively simply to the tool and nevertheless allow the production of substantially freely specifiable profile modifications of the workpiece.

In an alternative, extended embodiment of the present disclosure, the topological modification of the surface geometry of the tool in the generating pattern can be described at least approximately in a first direction of the tool as a constant, linear or quadratic function whose coefficients in the width direction of the tool are given by coefficient functions $F_{FtC,1}$ for the constant portion, $F_{FtL,1}$ for the linear portion, and/or $F_{FtQ,1}$ for the square portion. Such modifications can likewise still be manufactured simply and can extend the usable region of the tool. In the event that the coefficient functions $F_{FtL,1}$ for the linear portion and $F_{FtQ,1}$ for the quadratic portion are equal to 0, the second alternative corresponds to the first alternative. However, at least one coefficient function and further optionally both coefficient functions $F_{FtL,1}$ for the linear portion and $F_{FtQ,1}$ for the quadratic portion is/are optionally different from (and thus not equal to) 0.

The first direction of the modification of the tool optionally corresponds to the direction of the line of action of the dresser during dressing both in the first alternative and in the second alternative. This allows a particularly simple production of the modification by a variation of the position between the dresser and the tool during the dressing process.

As already mentioned above, the method in accordance with the present disclosure permits the manufacture of profile modifications. A desired profile modification of the workpiece can therefore in particular be specified and can be produced by the generating machining on the tool within the framework of the present disclosure.

The desired profile modification and/or the properties of the desired profile modification are optionally freely specifiable within specific conditions. Alternatively or additionally, one of the following properties of the profile modification can be specified: crowning, profile angle deviation, tip relief and/or root relief. The following data can optionally be specified with respect to at least one of the above-named properties: size of the crowning, size of the profile angle deviation, amount and position of the tip relief, and amount and position of the root relief.

A plurality of the above-named properties and/or data can optionally be specified; further optionally, all of the above-named properties and/or data can be specified.

At least one input mask can further be provided having input boxes for at least one of the above-named properties and/or for their data. The input mask optionally has input boxes for a plurality of the above-named properties and/or their data, and further optionally has input boxes for all of said properties and/or their data.

Alternatively or additionally, the desired profile modification can also be freely specifiable as a continuous modification and/or at a plurality of rolling angles. If the modification is freely specifiable at a plurality of rolling angles, the extent of the modification is optionally interpolated between these rolling angles within the framework of the method in accordance with the present disclosure.

The topological modification of the tool in accordance with the present disclosure can optionally be produced in that the position of the dresser with respect to the tool is varied during dressing in dependence on the angle of rotation of the tool and/or on the tool width position. It is hereby possible to produce a topological modification during dressing, e.g. a modification whose value depends on the angle of rotation of the tool and/or on the tool width position. A topological modification is thereby produced such as was already shown in more detail above.

The generating method with which the workpiece is machined may be carried out in accordance with the present disclosure with a defined contact path on the tool, wherein the topological modification and/or the contact path is/are selected such that the topological modification on the tool has such a shape along the contact path that it produces a desired profile modification on the workpiece.

The topological modification can in particular be selected in dependence on the contact path, or the contact path can be selected in dependence on the topological modification, such that the topological modification on the tool has such a shape along the contact path that it produces a desired profile modification on the workpiece.

The machining with a defined contact path optionally comprises the machining with a defined initial shift position of the tool at the start of a machining stroke.

When machining a cylindrical workpiece, this initial shift position is optionally maintained over the entire machining stroke.

When machining a conical workpiece, the tool is shifted in contrast, optionally starting from the initial shift position, by such a diagonal ratio over the machining stroke such that the contact path is not shifted.

The present disclosure is based on the underlying recognition that the contact path which the contact point covers on the tool during the generating machining typically does not have the same direction as the line of action of the dresser on the dressing of the tool. A topological modification can therefore always be found for a defined contact path in accordance with the form defined in more detail above which produces the desired modification along this contact path. In the simplest case, in which the modification along the line of action with the dresser is constant on the tool, the desired modification along the contact path defines the form of the function $F_{Ft1}$ or, for the extended case, optionally defines the coefficient function $F_{FtC,1}$ for the constant portion of the modification. Substantially any desired profile modifications can hereby be produced in accordance with the present disclosure.

The method in accordance with the present disclosure can in particular comprise the following steps:

specifying a desired profile modification on the workpiece;

determining the modification of the tool along a defined contact path required for producing the desired profile modification on the workpiece;

determining a topological modification of the tool which corresponds to the modification determined in this manner along the contact path; and/or determining the variation of the position of the dresser with respect to the tool during the dressing of the tool suitable for providing a topological modification which corresponds to the modification determined in this manner along the contact path.

The topological modification is optionally produced in that the position of the dresser with respect to the tool during dressing is varied in dependence on the angle of rotation of the tool and/or on the tool width position. The variation is further optionally determined or takes place such that the specific modification results at the point of intersection between the line of action of the dresser with the tool and the contact path of the tool with the workpiece respectively given with a specific angle of rotation of the tool and at a specific tool width position, said specific modification then producing the desired modification on the workpiece within the framework of the generating machining method.

The defined contact path is optionally specified by a defined initial shift position of the tool.

Provision is further optionally made that a determining of the points of contact between the workpiece and the tool forming the contact path in the generating machining first takes place for determining the modification of the tool along a contact path suitable for producing the desired modification on the workpiece. The points of contact or the contact path hereby formed is optionally determined analytically.

The position of the line of action of the dresser into the tool can furthermore be determined in dependence on the angle of rotation of the tool and/or on the tool width position for determining the variation of the position of the dresser with respect to the tool suitable for providing a topological modification. The determination can take place, for example, by a dressing simulation.

The direction of the line of action is optionally assumed as constant and in particular as independent of the modification used. This in particular applies to involute gearings in a good approximation.

Alternatively, the influence of a modification on the direction of the line of action can be taken into account. Such a taking into account can in particular take place for non-involute gearings in which the influence of a modification on the direction of the line of action can be greater. It must furthermore be taken into account with non-involute gearings that the line of action typically no longer corresponds to a straight line.

A profile modification produced in accordance with the present disclosure can also have other modifications superposed on it.

In accordance with a first aspect, the machining kinematics can be modified within the framework of the generating method to superpose a modification produced by the modification of the machining kinematics on the modification on the workpiece produced by the topological modification of the tool. The profile modification produced in accordance with the present disclosure can in particular have a naturally twisted tooth trace modification superposed on it.

A modified dresser can furthermore be used for dressing the tool within the framework of the present disclosure. The modification of the tool produced by the modification of the dresser can have a topological modification superposed on it which is produced in that the position of the dresser with respect to the tool is varied during dressing in dependence on the angle of rotation of the tool and/or on the tool width position. The topological modification can in particular be determined and produced in the same manner as has already been described above.

The topological variation is optionally selected such that the superposition of the modifications on the tool along a selected contact path with the workpiece corresponds to a modification along the contact path suitable or producing a desired profile modification on the workpiece. In this embodiment of the present method, the fact that a modified dresser is used for dressing therefore has no influence on the form of the modification along the selected contact path. The topological modification is rather also selected here such that it has a form along this selected contact path which produces the desired profile modification within the framework of the generating machining.

The use of a modified dresser within the framework of the present disclosure can, however, be of advantage if only a modified dresser is available for a specific dressing job. It can then be used in accordance with the present disclosure since the modification of the dresser is compensated with respect to the modification along the contact path and thus the profile modification.

The selection of a modified dresser can also have relevance within the framework of the present disclosure in that, in addition to the selected contact path with respect to which the topological profile modification was produced, even further contact paths are used for a generating machining at which the modification is thus no longer optimal. The quantity or the region of contact paths which still produces modifications on the workpiece within the permitted tolerance, can optionally be extended by the use of a modified dresser.

A dresser can furthermore be used in accordance with the present disclosure for dressing the tool which was designed for a tool having a different macrogeometry, and which was in particular designed for a tool having a different diameter and/or a different number of threads.

Such dressers which were designed for a different tool produce a deviation from the desired modification on the workpiece without a modification of the dressing process. The modification of the surface geometry of the tool produced by the non-matching dresser is therefore optionally compensated in accordance with the present disclosure at a selected contact path with the workpiece in that the position of the dresser with respect to the tool during dressing is suitably varied in dependence on the angle of rotation of the tool and/or on the tool width position. The unwanted modification produced by the non-matching dresser can thus be compensated for at least a contact path. The generating machining method is then optionally carried out with the selected contact path for which the modification was compensated.

Such a method can in particular be used when the diameter of the tool has reduced after a plurality of dressing procedures such that the dresser no longer matches the tool or such that the modifications produced by the reduced diameter of the tool during dressing are outside the permitted tolerance. In accordance with the prior art, such tools having reduced diameters either have to be dressed by a different dresser or cannot continue to be used. The present disclosure allows the further use of such tools since the non-permitted modifications can at least be compensated for a contact path.

The present disclosure comprises, in a second, independent aspect, a method of producing a workpiece having a desired gearing geometry by means of a suitably dressed tool comprising the steps:

specifying a desired profile modification of the workpiece;

selecting a combination from a plurality of combinations of a dresser and a tool which produces the smallest deviations from the desired profile modification without any modification of the dressing process;

a modified dressing of the tool with the dresser in line contact for producing a topological modification of the tool to compensate the deviations; and generating machining the workpiece with the dressed tool with a contact path unchanged over the machining stroke to produce the desired profile modification.

As already presented above, it can be of advantage to select a combination of dresser and tool which already produces a profile extent on the workpiece without the use of the method in accordance with the present disclosure, said profile extent having the lowest possible deviations from the desired profile modification. Only smaller deviations or a smaller modification hereby have to be produced by the use of the method in accordance with the present disclosure and by the topological modification of the tool used. This can in particular have the advantage that the quantity or the region of contact paths which can still be used within a permitted tolerance becomes larger.

The dressers and/or tools are optionally an at least partly specified or already existing range. A selection is optionally made from this range to find a combination of dresser and tool which is the best possible match.

The method in accordance with the present disclosure in accordance with the second aspect is optionally carried out such has already been described in more detail above with respect to the first aspect. The determination and/or production of the topological modification of the tool and the generating machining is/are in particular carried out such as has already been shown in more detail above.

In a third aspect, likewise independent, of the present disclosure, it comprises a method of manufacturing one or more workpieces having a desired gearing geometry by means of a suitably dressed tool, wherein, after the carrying out of one or more machining steps, the tool is respectively dressed before further machining steps are carried out at the same workpiece or at further workpieces. Provision is made in accordance with the present disclosure that in a later dressing process, a different topological modification of the tool is produced with respect to an earlier dressing process. The diameter of the tool which reduces in size due to the plurality of dressing processes can thus in particular be taken into account within the framework of the present disclosure in the production of the topological modification. The topological modification can in this respect in particular be produced for the respective dressing process such that a modification is adopted along a specified contact path which produces a desired profile modification within the framework of the generating grinding of the workpiece.

The method in accordance with the third aspect can optionally be combined with a method in accordance with the first and/or second aspect. In this respect, the topological dressing and/or the generating machining can in particular be carried out such as has already been explained in more detail above.

Advantageous embodiments of the present disclosure which can be used in any of the of the above-described aspects of the present disclosure as well as in any desired combinations of these aspects will be shown in more detail in the following:

As already presented in more detail above, the present method allows a specified profile modification to be produced substantially exactly in a generating machining with a specified initial shift position or a contact path defined by this initial shift position. In contrast, with initial shift positions or with a contact path which are/is shifted with respect to such an ideal initial shift position or such an ideal contact path, deviations from the desired profile modification result since the topological modification can only have exactly the desired form for one contact path or for one initial shift position. In many cases, however, there are shifted contact paths or initial shift positions with which the desired profile modification can still be produced within the permitted tolerance. The tool or the tool width can hereby be utilized better.

In accordance with the present disclosure, during a machining of one or more workpieces, at least one stroke can be carried out with a first initial shift position of the tool and/or with a first contact path and at least one second stroke can be carried out with a second initial shifted shift position of the tool and/or with a second, shifted contact path. The tool width can hereby be utilized better.

The first initial shift position and/or the first contact path is optionally less shifted with respect to an ideal initial shift position or an ideal contact path than the second initial shift position and/or the second contact path. The first initial shift position can in particular correspond to the ideal initial shift position and/or the first contact path can correspond to the ideal contact path. In accordance with the present disclosure, a generating machining can therefore be carried out, on the one hand, with the ideal initial shift position or with the ideal contact path. To utilize the tool more uniformly, work can, however, also be carried out using a second initial shift position or a second contact path shifted with respect to such an ideal initial shift position or such an ideal contact path, in particular when this second initial shift position and/or this second contact path produces a modification which is within a permitted tolerance with respect to the desired profile modification.

In a possible embodiment of the present disclosure, a rough machining step, in particular a roughing step, can be carried out using the second initial shift position. In such a rough machining step, the permitted tolerances are larger with respect to the profile shape so that the deviation from the ideal initial shift position or the ideal contact path and the deviations from the desired modifications hereby produced can be tolerated more easily. A fine machining step is furthermore optionally carried out using the first initial shift position and/or the first contact line. The permitted tolerances are smaller in the fine machining step so that work should be carried out closer to the ideal contact line or to the ideal initial shift position here or with the ideal initial shift position and/or the ideal contact path.

As already shown above, by the selection of a dresser which produces a modification on the tool without using the present method, with said modification producing a modification on the workpiece in the generating method which comes as close as possible to the desired modification, the usable range of initial shift positions and/or contact lines can be increased. The present disclosure, however, also provides possibilities independently of this to increase the usable range by a corresponding design of the topological modification.

In accordance with the present disclosure, the modification of the tool can be at least approximately describable in the generating pattern by a linear and/or quadratic function at least locally in a first direction of the tool, wherein the coefficients of this linear and/or quadratic function are formed in a second direction of the tool which extends perpendicular to the first direction by coefficient functions $F_{FtC,1}$ for the constant portion and $F_{FtL,1}$ for the linear portion and/or $F_{FtQ,1}$ for the quadratic portion. Such a modification with a linear and/or quadratic portion has further degrees of freedom with respect to a modification which is constant in the first direction, said further degrees of freedom optionally being able to be used for extending the usable range.

In accordance with the present disclosure, the coefficient function $F_{FtC,1}$ for the constant portion is determined such that a desired profile modification is produced in the generating grinding at a specified initial shift position and/or with a specified contact path. The coefficient functions $F_{FtL,1}$ for the linear portion and/or the coefficient function $F_{FtQ,1}$ for the quadratic portion is/are then optionally determined such that the deviations from the desired profile modification are minimal which arise on the workpiece in a generating machining with at least one shifted initial shift positions and/or contact path and/or with at least one band or one range of initial shift positions or contact paths. The determination of the coefficient functions can take place by a compensation calculation, for example.

In a possible embodiment of the present disclosure, the deviations can be weighted differently in dependence on the generating path to take account of different tolerances along the profile.

The spacing of the shifted shift positions and/or contact paths or the width of the band can furthermore be determined iteratively such that the deviation arising on the workpiece still lies within a specified tolerance in all contact paths.

The present disclosure provides even further possibilities to be able to utilize the tool width as much as possible.

In accordance with the present disclosure, the tool can have at least one region having a first topological modification and a second region having a second topological modification, wherein the first topological modification along a contact path with the workpiece in a first initial shift position is identical to the second topological modification along a contact path with the tool in a second initial shift position. The desired profile modification can hereby be produced exactly in this case at the first and second initial shift positions.

In this respect, at least one stroke can be carried out with the first initial shift position of the tool during a machining of one or more workpieces and at least one second stroke with the second initial shift position of the tool. Both the first region and the second region of the tool are hereby used within the framework of the present disclosure to machine a workpiece.

The first region optionally comprises the complete contact path with the workpiece in the first initial shift position and the second region likewise comprises a complete contact path with the workpiece in the second initial shift position. The two regions can thus each be used to produce a complete profile of the workpiece and to provide the desired profile modification.

In a preferred embodiment of the present disclosure, the first topological modification is identical with the second topological modification. A plurality of identical topological modifications are in particular thus arranged next to one another on the tool. The tool width can hereby be used better.

In accordance with the present disclosure, a desired profile modification of the tool can be specified and a modification of the tool suitable for the production of this desired modification and/or a suitable variation of the position of the dresser with respect to the tool can be determined during dressing in dependence on the angle of rotation of the tool and/or on the tool width position. The modification of the tool along a contact line between the tool and the workpiece is optionally determined from the desired profile modification of the workpiece by means of an inverse of an association function which describes the mapping of the surface of the tool to the surface of the workpiece on the generating grinding with a specific initial shift position of the tool. The determination optionally takes place using a function which analytically describes the mapping of the surface of the tool to the surface of the workpiece on the generating grinding. This function in particular optionally associates a point along the contact path on the workpiece and thus a point along the profile on the workpiece with each point along the contact path on the tool.

In accordance with the present disclosure, the tool is optionally dressed in a modified form by means of a profile roller dresser and/or a form roller dresser. Such a profile roller dresser and/or form roller dresser optionally has an axis of rotation and a profile rotationally symmetrical about this axis of rotation.

The dressing optionally takes place in accordance with the present disclosure in line contact with the tool. The topological modification in accordance with the present disclosure is designed such that a contour dressing is not necessary for its production. The modification can rather also be produced during a dressing in line contact in that, as described above, the position between the dresser and the tool is varied in dependence on the tool width position and/or on the angle of rotation of the tool.

In accordance with a first variant of the present disclosure, the profile roller dresser or form roller dresser can be in contact with the tooth of the tool during the dressing from the root region to the tip region so that the modification is produced over the total tooth depth in one stroke. In a second, alternative variant, the profile roller dresser or form roller dresser can be in contact with the tooth of the tool only in part regions between the root and the tip during dressing so that the specific modification takes place over the total tooth depth in a plurality of strokes and at a respective different relative positioning of the dresser. Such a dressing of the tool in a plurality of strokes has the advantage in principle that an even greater class of topological modifications can be produced. However, this is not necessary for the carrying out of the present disclosure since a topological modification suitable for the method in accordance with the present disclosure can also be produced in a single stroke. The dressing in a plurality of strokes can, however, also have technological advantages, for example when no dresser is available which would have a sufficient profile length.

The production of the topological modification of the tool in accordance with the present disclosure can take place in that one or more of the following corrections of the axial movements with respect to the conventional dressing kinematics are carried out:

a) varying the center distance of the dresser from the tool in dependence on the angle of rotation of the tool or on the tool width position, e.g. varying the feed in dependence on the angle of rotation of the tool and/or on the tool width position;

b) varying the axial feed of the tool or of the dresser in dependence on the angle of rotation of the tool and/or on the tool width position, e.g. varying the shift movement of the dresser or of the tool in dependence on the angle of rotation of the tool and/or on the tool width position;

c) varying the axial cross angle of the tool and of the dresser in dependence on the angle of rotation of the tool and/or on the tool width position, e.g. a variable pivot movement of the dresser relative to the tool in dependence on the angle of rotation of the tool and/or on the tool width position; and d) varying the tool speed in dependence on the angle of rotation of the tool and/or on the tool width position. The angle of rotation of the tool is typically fixedly coupled to the tool width position to shift the profile produced on the tool by the dresser along the tooth flank. Modifications can therefore be produced by varying the ratio between the angle of rotation of the tool and the tool width position.

Alternatively or additionally, the modified dressing of the tool can take place in that the dresser is fed more or less in dependence on the angular position of the tool and/or on the tool width position or in that the tool is fed more or less onto the dresser, or vice versa, in dependence on its angular position and/or on the tool width position.

Furthermore, at least three degrees of freedom, and optionally four or five degrees of freedom, can be used during the relative positioning between the dresser and the tool for producing the desired modification. The degrees of freedom are optionally set independently of one another for producing the desired modification. Optionally, at least three, four or all of the following five degrees of freedom can be used: angle of rotation of the tool; axial position of the tool; y position of the dresser; center distance; and/or axial cross angle. The axial position of the tool, e.g. the tool width position, is optionally used to displace the contact line of the dresser. Two, three of four degrees of freedom of the remaining four degrees of freedom can now be set independently of one another to produce the specific modification along the contact line.

The present disclosure furthermore comprises a tool for carrying out a method in accordance with the present disclosure as was shown above. The tool in accordance with the present disclosure has at least one first region with a first topological modification. The topological modification is configured in accordance with the present disclosure such that it produces the desired modification on the workpiece along a contact path with the workpiece during generating machining with a contact path unchanged over the machining stroke. The topological modification optionally has an embodiment such as was described in more detail above.

A tool in accordance with the present disclosure can have only one region with a single topological modification in a possible embodiment. To utilize the tool width better, the tool in accordance with the present disclosure can, however, furthermore have a second region with a second topological modification, wherein the first topological modification along a contact path with the workpiece having a first initial shift position is identical with the second topological modification along a contact path with the workpiece in a second initial shift position. The tool can thus be used with the first and second initial shift positions in each case for producing an identical profile. The tool can furthermore also have an unmodified region beside the modified region. The unmodified region may be used for a rough machining of the workpieces, whereas the modified region may be used for a fine machining of the workpieces. This provides the advantage that in this embodiment, the number of machined workpieces between the dressing cycles is larger since the main machining performance is produced by the unmodified roughing region and only the last quality-determining cuts take place in the modified finishing region and this thus does not wear so fast.

The first region in each case comprises in accordance with the present disclosure the respective complete contact path with the workpiece at the first initial shift position and/or the second region comprises the respective complete contact path with the workpiece at the second initial shift position.

In accordance with the present disclosure, the first topological modification can optionally be identical to the second topological modification. In this case, the tool has at least two identical topological modifications next to one another.

The present disclosure furthermore comprises a gear manufacturing machine for carrying out a method such as was described in more detail above. The gear manufacturing machine in this respect optionally has a control (e.g., a control system including a control unit, sensors and/or input devices, and actuators, the control unit including a processor and non-transitory memory having instructions stored therein for controlling the actuators to in turn control operation of the gear manufacturing machine and the components thereof) for carrying out a method in accordance with the present disclosure.

The gear manufacturing machine in accordance with the present disclosure can in particular comprise an input function via which a desired modification of a workpiece is specifiable, wherein the gear manufacturing machine optionally has a determination function which determines a modification of the tool suitable for the production of this desired modification and/or a suitable variation of the position of the dresser with respect to the tool during the dressing in dependence on the angle of rotation of the tool and/or on the tool width position. The gear manufacturing machine can furthermore have a dressing function which produces a modification of the tool suitable for the production of the desired modification of the workpiece during the dressing on the tool.

The gear manufacturing machine can in particular have a workpiece holder and a tool holder which are each rotatable about an axis of rotation and which are movable relative to one another over further axes of movement of the gear manufacturing machine to carry out a generating machining in accordance with the present disclosure. The gear manufacturing machine further optionally has a dresser holder which is likewise movable about an axis of rotation to dress a tool with the dresser. The tool can be located in the tool holder, the workpiece holder or in a separate further holder while it is being dressed. The gear manufacturing machine optionally has axes of movement to vary the relative position between the dresser and the tool in accordance with the present disclosure during dressing.

The present disclosure further comprises a computer program having an input function for inputting data with respect to a desired modification of the workpiece and having a function for determining a topological modification of the tool suitable for producing this desired modification and/or a suitable variation of the position of the dresser with respect to the tool during dressing in dependence on the angle of rotation of the tool and/or on the tool width position such that the desired modification of the workpiece can be produced by generating machining using the topologically modified tool with a contact path unchanged over the machining stroke. For the case of conical workpieces, the computer program can furthermore have a function to determine the diagonal ratio in a single-flank generating machining for the left and/or right flank such that the contact path is not shifted on the tool during the machining, and optionally has a function to determine the geometry of the tool, in particular the conical angle and/or the profile angle, such that the same diagonal ratio results for the left and right flanks and optionally also determines this diagonal ratio. The computer program in accordance with the present disclosure can, for example, be stored on a data carrier or in a memory. The computer program can optionally be installable on a gear manufacturing machine and/or can have an output function for data for use on a gear manufacturing machine. The functions of the computer program optionally implement a method such as was presented in more detail above.

The input function of a gear manufacturing machine in accordance with the present disclosure or a computer program in accordance with the present disclosure optionally allows the specification of a desired profile modification, wherein the desired profile modification and/or its properties is/are optionally specifiable within specific conditions. Alternatively or additionally, at least one of the following properties of the profile modification can be specified: crowning, profile angle deviation, tip relief and/or root relief.

The following data can optionally be specified with respect to at least one of the following properties: size of the crowning, size of the profile angle deviation, amount and position of the tip relief, and amount and position of the root relief.

A plurality of the above-named properties and/or data can optionally be specified; further optionally, all of the above-named properties and/or data can be specified.

The gear manufacturing machine or the computer program optionally has an input mask having input boxes for at least one of the above-named properties and/or their data. The input mask optionally has input boxes for a plurality of the above-named properties and/or their data, and further optionally has input boxes for all of said properties and/or their data.

Alternatively or additionally, the desired profile modification can be freely specifiable as a continuous modification and/or at a plurality of rolling angles.

The input function, the determination function and/or the dressing function of the gear manufacturing machine in accordance with the present disclosure and/or of the computer program in accordance with the present disclosure are optionally configured such that they implement a method in accordance with the present disclosure such as is described above. Optionally, the gear manufacturing machine and/or the computer program in particular carries/carry out the determinations such as was described in more detail above with respect to the method in accordance with the present disclosure.

The present disclosure can in principle be used with any desired generating methods for machining a workpiece. It is, however, optionally used in a generating grinding method, in particular for the hard fine machining of a workpiece.

The workpieces can be any desired toothed workpieces. The present disclosure is optionally used for manufacturing gear wheels. The gear wheels optionally have a spur gear gearing. The gear wheels can have an internal gearing or an external gearing. The gearing can be a straight gearing or a helical gearing. The workpieces or the gear wheels can have a cylindrical or a conical base shape.

A grinding worm is optionally used as the tool. The grinding worm is optionally dressable and, for example, has a grinding body composed of a corundum material.

The present disclosure can be used both for manufacturing symmetrical gearings and for manufacturing asymmetrical gearings.

The present disclosure can furthermore be used for manufacturing cylindrical gearings and for manufacturing conical gearings.

Both a cylindrical grinding worm and a grinding worm having a conical base body can be used as the tool.

The present disclosure is optionally used for producing an involute gearing. The present disclosure can, however, also be used for producing non-involute gearings.

The dressing in accordance with the present disclosure optionally takes place on two flanks. The machining of the workpiece furthermore optionally also takes place on two flanks. Work is optionally carried out on one flank in the manufacture of a conical gearing with a cylindrical tool.

BRIEF DESCRIPTION OF THE FIGURES

The present disclosure will now be explained in more detail with reference to drawings and to embodiments. The Figures only show w-z diagrams of cylindrical gearings by way of example. The w-z diagrams of conical gearings are generally not rectangular, are typically trapezoidal, since the evaluation region of the generating path varies over the gearing width.

DETAILED DESCRIPTION

Figure 1:
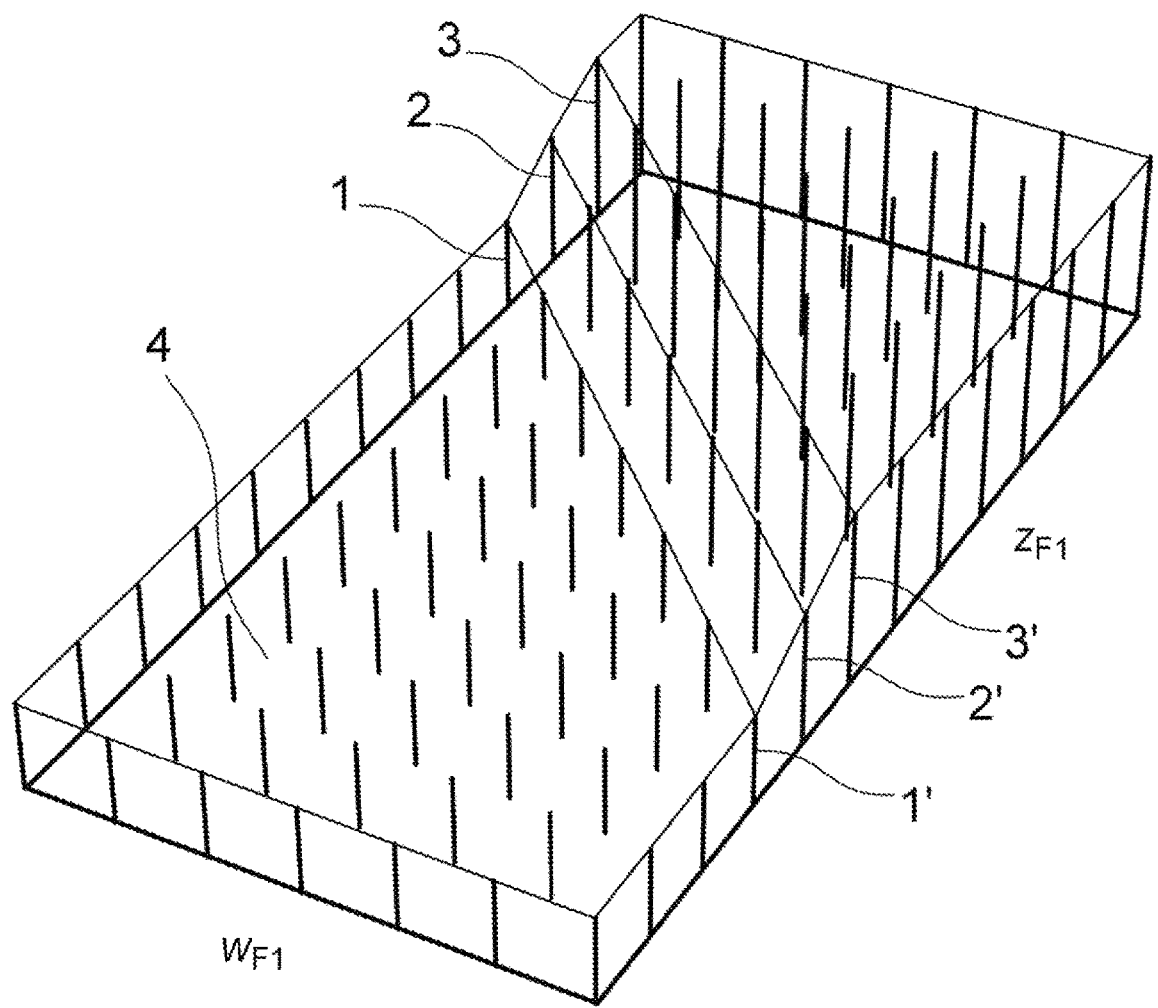
FIG. 1 schematically shows a section of the flank of a worm thread with vectors in the normal direction for a worm not dressed over the whole width. The number of vectors was considerably reduced here in comparison with a simulation calculation. The plane 4 shown schematically here corresponds to the generally curved flank of the non-modified worm onto which the vectors are placed. The vectors 1 and 1' were already swept over by the contact line and are thus completely shortened. The vectors 2 and 2' have already been shortened at least once, but have not yet been swept over by the contact line. The vectors 3 and 3' have not yet been shortened and thus still have the length corresponding to the selected allowance.

The present disclosure describes a method of dressing worms and of generating grinding a spur gear gearing having a correspondingly dressed worm. The method allows the profile shape of the generating ground gearing to be freely specified within certain limits for a given dresser without the time-consuming use of contour dressers. Free profile modifications such as crownings or root/tip reliefs can in particular be implemented with a dresser which does not store these modifications or which stores other modifications. The gearings can all have profiles which can be generated, that is profiles which can be ground by a worm. The gearings can in particular have involute profiles. The gearings can be both symmetrical and asymmetrical. For involute profiles, this means that the profile angles and/or the profile modification of the left and right flanks can also be different. Furthermore, both the worm and the machined workpiece can be cylindrical or conical. Conical worms or workpieces are characterized by different leads on the left and right flanks. In the cylindrical case, the leads are identical on both sides. Involute, conical gearings are frequently also called beveloids.

The grinding process takes place with a worm which is topologically modified over the tool length and whose axial direction is shifted during the grinding process in dependence on the axial feed position of the workpiece just such that the contact path on the worm is not shifted during the machining. If cylindrical workpieces are ground, this condition is equivalent to the worm not being shifted in its axial direction (axial generating grinding). If conical workpieces are ground, the method generally takes place in the diagonal generating method. Where the contact path extends on the worm is here of decisive importance for the method. If cylindrical workpieces are ground, which shift position (axial position of the worm) grinding takes place at is therefore decisive. If conical workpieces are ground, the diagonal ratio and the shift range at which grinding takes place is decisive, e.g. at which shift position a stroke is started during grinding.

Parameters which differ or which may differ for left and right flanks are provided with the index F. F can be l (left) or r (right). Equations in which the index F occurs always apply to left and right flanks.

The involute gearings first discussed in more detail in the following are divided into the following four types in dependence on the base circle radii ($r_{br}$, $r_{bl}$) and on the base helix angles ($\beta_{br}$, $\beta_{bl}$).

Cylindrically symmetrical: $r_b := r_{br} = r_{bl}$ and $\beta_b := \beta_{br} = \beta_{bl}$ Cylindrically asymmetrical:

$$r_{br} \neq r_{bl} \text{ and } \frac{\tan\beta_{br}}{r_{br}} = \frac{\tan\beta_{bl}}{r_{bl}}$$

Conically symmetrical: $\beta_{br} \neq \beta_{bl}$ and $r_{br} \cos\beta_{br} = r_{bl} \cos\beta_{bl}$ Conically asymmetrical:

$$\beta_{br} \neq \beta_{bl} \text{ and } r_{br}\cos\beta_{br} \neq r_{bl}\cos\beta_{bl} \text{ and } \frac{\tan\beta_{br}}{r_{br}} \neq \frac{\tan\beta_{bl}}{r_{bl}}$$

Values which relate to the tool are provided with the index 1 and those which relate to the workpiece are provided with the index 2.

The profile modifications on the gearing are described by the function $f_{Ft2}(w_{F2})$, where $w_{F2}$ is the generating path and $z_{F2}$ is the position in the width line direction.

The class of the topological surface modifications is defined in the following which are produced or used in the method described here on the worm in the involute case. Topological modifications are described generally via a function $f_{Ft1}(w_{F1}, z_{F1})$, where $w_{F1}$ is the generating path and $z_{F1}$ is the position in the width line direction. A topological surface modification on the worm belongs to the class of surface modifications looked at here when there is a function $F_{Ft1}$, with at least approximately $$f_{Ft1}(w_{F1}, z_{F1}) = F_{Ft1}(w_{F1} \sin\rho_{F1} + z_{F1} \cos\rho_{F1}) = F_{Ft1}(X_{F1}) \quad (1)$$

In illustrative terms, this means that the surface modification has the same value for all $w_{F1}$ and $z_{F1}$ on the tooth flank, where $$w_{F1} \sin\rho_{F1} + z_{F1} \cos\rho_{F1} = X_{F1} \quad (2)$$

where $X_{F1}$ is any desired real number having the same value. Each $X_{F1}$ thus unambiguously defines a straight line on the flank in the coordinates $w_{F1}$ and $z_{F1}$.

The underlying idea of the present disclosure will be looked at in more detail in the following. A worm which likewise has involute gearings, as a rule with a large helix angle, is used for the generating grinding of involute gearings. There is a theoretical point contact between the worm and the end geometry of the gearing to be produced during the machining process. The surfaces of the tooth flanks, both of the workpiece and of the tool, are typically parameterized over the rolling path ($w_F$) and the position in the width line direction ($z_F$).

$$E_F(w, z) = \begin{pmatrix} r_{bF} \cdot \sin\left(s_F \cdot \left(\frac{w}{r_{bF}} + \eta_{bF}\right) - \frac{z \cdot \tan(\beta_{bF})}{r_{bF}}\right) - \\ s_F \cdot w \cdot \cos\left(s_F \cdot \left(\frac{w}{r_{bF}} + \eta_{bF}\right) - \frac{z \cdot \tan(\beta_{bF})}{r_{bF}}\right) \\ r_{bF} \cdot \cos\left(s_F \cdot \left(\frac{w}{r_{bF}} + \eta_{bF}\right) - \frac{z \cdot \tan(\beta_{bF})}{r_{bF}}\right) + \\ s_F \cdot w \cdot \sin\left(s_F \cdot \left(\frac{w}{r_{bF}} + \eta_{bF}\right) - \frac{z \cdot \tan(\beta_{bF})}{r_{bF}}\right) \\ z \end{pmatrix} \quad (3)$$

$\eta_{bF}$: see also the application DE 10 2012 015 846 A1

$s_F$ serves to write equations for left and right flanks in a compact form and is defined by:

$$s_F := \begin{cases} +1, & \text{for left flanks} \\ -1, & \text{for right flanks} \end{cases}$$

This parameterization allows simple relationships to be calculated for the progression of the contact point (contact path) on the tool and on the workpiece. This progression is continuously displaced on the workpiece by its axial feed. The knowledge of these progressions makes it possible to associate a point on the workpiece unambiguously with a point on the tool, and vice versa. The surface modification on the tool can be adjusted with this association such that the desired modification is produced on the workpiece.

The following definitions are made to formulate the relationships mathematically.

The following terms are used for transformations:

$R_x(\varphi)$: rotation by the angle $\varphi$ about the x axis. Analogous for y and z.

$T_x(v)$: translation by the path v in the x direction. Analogous for y and z.

$H(A_1, \ldots, A_N)$: general transformation describable by a homogenous matrix with a total of N coordinates $A_1$ to $A_N$.

The term "coordinates" is used here for generalized, not necessarily independent coordinates.

The axis of rotation of a gearing in its system of rest always coincides with the z axis. The gearing center is at z=0.

It is furthermore important for the formulation of the relationships to define the kinematic chains which describe the relative positions between the workpiece and the tool. This depends on whether the tool or the workpiece is cylindrical or conical. All four possible combinations will be looked at here.

Kinematic Chain for a Cylindrical Tool and a Cylindrical Workpiece

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_z(\varphi_2) \quad (4)$$

$\varphi_1$: Tool angle of rotation.
$\varphi_2$: Workpiece angle of rotation.
$z_{V1}$: Axial feed of the tool (also called the shift position).
$z_{V2}$: Axial feed of the workpiece.
d: Center distance (tool/workpiece).
γ: Axial cross angle (tool/workpiece).

Kinematic Chain for a Conical Tool and a Cylindrical Workpiece

The relative position between the tool and the workpiece is described by the following kinematic chain $K_R$:

$$K_R = R_z(-\varphi_1) \cdot T_y(r_{w1}) \cdot R_x(\theta_1) \cdot T_z(-z_{V1}) \cdot T_y(d) \cdot R_y(\gamma) \cdot T_z(z_{V2}) \cdot R_z(\varphi_2) \quad (5)$$

$\varphi_1$: Tool angle of rotation.
$\varphi_2$: Workpiece angle of rotation.
$Z_{V1}$: Feed of the tool (also called the shift position).
$z_{V2}$: Axial feed of the workpiece.
d: Dimension for the center distance (tool/workpiece).
γ: Axial cross angle (tool/workpiece).
$\theta_1$: Tool conical angle.
$r_{w1}$: Pitch circle radius of the tool.

Kinematic Chain for a Cylindrical Tool and a Conical Workpiece

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_x(-\theta_2) \cdot T_y(-r_{w2}) \cdot R_z(\varphi_2) \quad (6)$$

$\varphi_1$: Tool angle of rotation.
$\varphi_2$: Workpiece angle of rotation.
$Z_{V1}$: Axial feed of the tool (also called the shift position).
$z_{V2}$: Feed of the workpiece.
d: Dimension for the center distance (tool/workpiece).
γ: Axial cross angle (tool/workpiece).
$\theta_2$: Workpiece conical angle.
$r_{w2}$: Pitch circle radius of the workpiece.

Kinematic Chain for a Conical Tool and a Conical Workpiece

The relative position between the tool and the workpiece is described by the following kinematic chain $K_R$:

$$K_R = R_z(-\varphi_1) \cdot T_y(r_{w1}) \cdot R_x(\theta_1) \cdot T_z(-z_{V1}) \cdot T_y(d) \cdot R_y(\gamma) \cdot T_z(z_{V2}) \cdot R_x(-\theta_2) \cdot T_y(-r_{w2}) \cdot R_z(\varphi_2) \quad (7)$$

$\varphi_1$: Tool angle of rotation.
$\varphi_2$: Workpiece angle of rotation.
$z_{V1}$: Feed of the tool (also called the shift position).
$z_{V2}$: Feed of the workpiece.
d: Dimension for the center distance (tool/workpiece).
γ: Axial cross angle (tool/workpiece).
$\theta_1$: Tool conical angle.
$\theta_2$: Workpiece conical angle.
$r_{w1}$: Pitch circle radius of the tool.
$r_{w2}$: Pitch circle radius of the workpiece.

These kinematic chains initially first only serve the mathematical description of the present disclosure described here. They do not have to match the physical axles of the machine on which the present disclosure is used. If the machine has a movement apparatus, which makes possible relative positions between the tool and the workpiece in accordance with a transformation $$H(A_1, \ldots, A_{N_S}) \text{ where } N_s \geq 1 \quad (8)$$

the present disclosure can be used on this machine when there are coordinates $A_1, \ldots, A_{N_S}$ for each set of coordinates from the kinematic chains just described which set is calculated in this present disclosure, where $$H(A_1, \ldots, A_{N_S}) = K_R \quad (9)$$

The calculation of the coordinates $A_1, \ldots, A_{N_S}$ can be carried out by a coordinate transformation.

Typical movement apparatus which make possible all the required relative positions are, for example, described by the following kinematic chains:

$$H_{Bsp1} = R_z(\varphi_{B1}) \cdot T_z(-v_{V1}) \cdot R_x(90°-\varphi_{A1}) \cdot T_z(-v_{Z1}) \cdot T_x(-v_{X1}) \cdot R_z(\varphi_{C2}) \quad (10)$$

$$H_{Bsp2} = R_z(\varphi_{B1}) \cdot R_x(90°-\varphi_{A1}) \cdot T_z(-v_{Z1}) \cdot T_z(-v_{Z1}) \cdot T_x(-v_{X1}) \cdot R_z(\varphi^{C2}) \quad (11)$$

Figure 9:
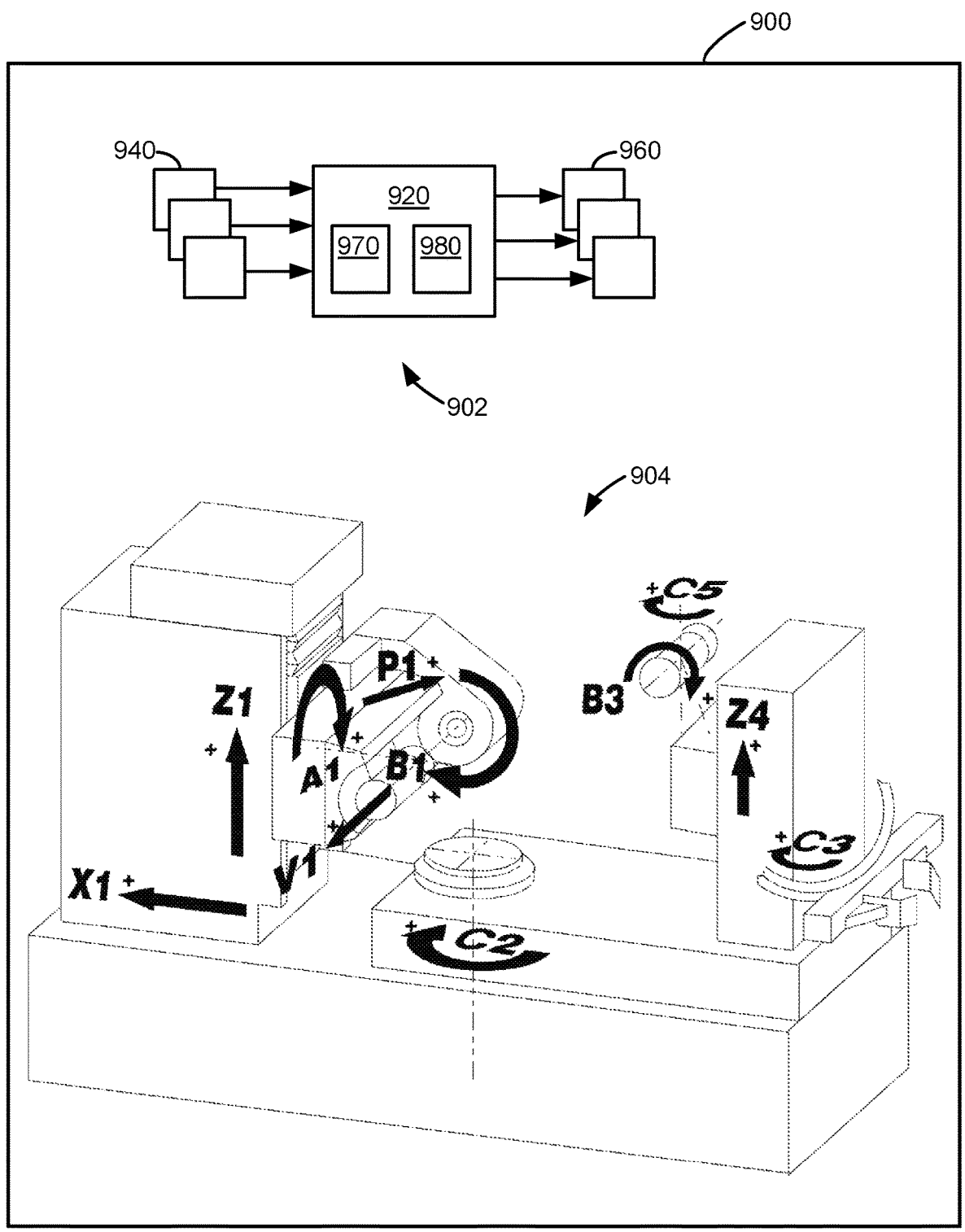
FIG. 9 schematically shows a gear manufacturing machine having the movement apparatus listed as examples here.

FIG. 9 schematically shows a gear manufacturing machine 900 having a movement apparatus 904 described by $H_{Bsp1}$.

The gear manufacturing machine is a combination of a manufacturing machine and a dressing machine. The gear manufacturing machine has a machining head shown at the left having a tool holder, a workpiece holder shown at the center and a dresser holder shown schematically at the right. A workpiece clamped in the workpiece holder can be machined by a tool clamped in the tool holder for carrying out a gear manufacturing machining. To carry out a dressing process, the tool clamped in the tool holder can be machined by a dresser clamped in the dresser holder. This has the advantage that the tool for dressing can remain in the tool holder. The axes of movement of the machining head can furthermore be used for setting the relative position of the tool and the dresser on the dresser.

The gear manufacturing machine has the axes of movement A1, B1, V1, X1, Z1 for moving the tool holder C2, for moving the workpiece holder and B3, C5 for moving the dresser.

In detail, B1 allows a rotation of the tool about its axis of rotation; X1 allows a translatory movement of the tool perpendicular to the axis of rotation of the tool or workpiece; Z1 allows a translatory movement of the tool in a vertical direction or in parallel with the axis of rotation of the workpiece; A1 allows a pivot movement of the tool; V1 allows a tangential movement or shift movement of the tool in the direction of its axis of rotation; C2 allows a rotary movement of the workpiece; B3 allows a rotational movement of the dressing tool about its axis of rotation; and C5 allows a pivot movement of the dressing tool to change the pressure angle α at the tool.

As shown, gear manufacturing machine 900 includes a control system 902. Control system 902, which is shown schematically in FIG. 9, includes a control unit 920, sensors and/or input devices 940, and actuators 960. Control unit 920 includes a processor 970 and non-transitory memory 980, the non-transitory memory having instructions stored therein for controlling the gear manufacturing machine and the components thereof in the manner described herein. For example, the various functions, calculations, and algorithms described herein may be performed/carried out via execution, at processor 970, of instructions stored in non-transitory memory 980. Further, a computer program may be installed on the gear manufacturing machine, e.g. installed and thereafter stored in non-transitory memory of the control system of the gear manufacturing machine, and the computer program may include instructions stored in the non-transitory memory which are executable by the processor of the control system to perform the various functions, calculations, determinations, and algorithms described herein. The sensors and/or input devices 940 represent various sensors and/or input devices, e.g. sensors and/or input devices for detecting a current state and position of the various components of the gear manufacturing machine. Sensors and/or input devices 940 further may include display devices, joysticks, etc. which receive input from an operator of the gear manufacturing machine and send signals to the control unit responsive to the operator input. Actuators 960 include the machining head and the dresser, as well as various components which effect the rotational and translational movement for the machining head, dresser, and workpiece holder, for example. Control unit 920 receives signals from the various sensors and/or input devices 940 and employs the various actuators 960 to adjust operation of the gear manufacturing machine, based on the received signals and the instructions stored in the non-transitory memory 960.

Other gear manufacturing machines and/or dressing machines can also be used for carrying out the methods in accordance with the present disclosure. The $z_{V2}$ coordinate is moved during the machining process and the feed of the workpiece is thus implemented. With cylindrical wheels, this is the axial feed; with conical wheels, this feed is not axial, but is tilted by the conical angle $\theta_2$ with respect to the axis of the gearing.

In the further course, however, the term feed is also used for $z_{V1}$ and $z_{V2}$ respectively for cylindrical tools or workpieces.

The four possible combinations of cylindrical and/or conical tools and workpieces will be looked at separately. The starting point in each case is the mathematical description of the progression of the contact point on the tool and on the workpiece in generating grinding as the relationship between the generating path (w) and the position in the width line direction (z) in dependence on the feed positions $z_{V1}$ and $z_{V2}$.

In preparation for this, the modifications on the worms required for this purpose and their production by means of dressing will first be discussed.

The tools, cylindrical and conical worms, symmetrical or asymmetrical, which will be looked at here likewise have a modification in accordance with equation (1). This type of modification is in particular very advantageous with dressable grinding worms since it can be produced easily on the worm when dressing with a dressing wheel. When dressing with a dressing wheel, there is a line contact between the dressing wheel and the flanks of the worm. If this contact line is described as a relationship between $w_{F1}$ and $z_{F1}$ for both flanks, a straight line is obtained in a very good approximation, given by:

$$w_{F1} \sin \rho_{F1} + z_{F1} \cos \rho_{F1} = X_{F1} \quad (12)$$

$\rho_{F1}$ defines the direction of this straight line. It can be slightly influenced by the number of threads, the diameter of the worm, the diameter of the dressing wheel, the profile angle of the worm and the relative position of the worm to the dresser.

$X_{F1}$ defines the position of the straight line on the worm. $X_{F1}$ changes accordingly while the worm is dressed along its length. If corrections to the relative position between the worm and the dressing wheel are carried out during the dressing process, modifications can be applied to the worm. These corrections always have an effect along the current contact line.

The relative position between the worm and the dresser is described by the following kinematic chain $K_{BR}$:

$$K_{BR} = R_z((-\varphi_S) \cdot T_z(-z_S) \cdot R_x(-\gamma_B) \cdot T_x(-d) \cdot T_y(\gamma_A) \cdot R_z(\varphi_A) \quad (13)$$

$\varphi_S$: Worm angle of rotation.
$\varphi_A$: Dresser angle of rotation.
$y_A$: y position of the dresser.
$z_S$: Axial position of the worm.
d: Center distance.
$\gamma_B$: Axial cross angle.

This kinematic chain initially first only serves the mathematical description of the present disclosure described here. It does not have to match the physical axles of the machine on which the present disclosure is used. If the machine has a movement apparatus, which makes possible relative positions between the worm and the dresser in accordance with a transformation $$H(B_1, \ldots, B_{N_A}) \text{ where } N_A \geq 1 \quad (14)$$

the present disclosure can be used on this machine when there are coordinates $B_1, \ldots, B_{N_A}$ for each set of coordinates from the kinematic chain just described which set is calculated in this present disclosure, where $$H(B_1, \ldots, B_{N_A}) = K_{BR} \quad (15)$$

The calculation of the coordinates $B_1, \ldots, B_{N_A}$ can be carried out by means of a coordinate transformation.

Typical movement apparatus which make possible all the required relative positions are, for example, described by the following kinematic chains:

$$H_{BBsp1}=R_z((-\varphi_{B1}) \cdot T_z(-v_{V1}) \cdot R_x(-\varphi_{A1}) \cdot T_x(-v_{X1}) \cdot T_y(v_{Z1}) \cdot R_y(\varphi_{C5}) \cdot R_z(\varphi_{B3}) \quad (16)$$

$$H_{BBsp2}=R_z(-\varphi_{B1}) \cdot T_z(-v_{V1}) \cdot R_x(-\varphi_{A1}) \cdot T_x(-v_{X1}) \cdot T_y(v_{Z1}) \cdot R_z(\varphi_{B3}) \quad (17)$$

FIG. 9 schematically shows a gear manufacturing machine having a movement apparatus described by $H_{BBsp1}$ or $H_{BBsp2}$.

Center distance and/or
Axial position of the worm and/or
y position of the dresser and/or
Angle of rotation of the worm and/or
Axial cross angle between the worm axis and the dresser axis can be corrected such that a constant modification is produced along the current contact line.

If a worm is dressed in a non-modified state, only the axial position of the worm and, coupled via the pitch height of the worm, the angle of rotation of the worm are changed during the dressing process. The contact line thereby migrates along the worm length in accordance with a helical line and sweeps over a certain region of the flank and dresses it. $X_{F1}$ is thus a function of the axial position of the worm.

$$X_{F1}=X_{F1}(z_S) \quad (18)$$

This relationship applies both to the single-flank dressing and to the two-flank dressing.

If dressing is carried out on two flanks, the corrections of the relative position can be selected such that any desired constant modifications $f_{d1}$ and $f_{tr1}$ can be applied to the left and to the right along the current contact lines on both flanks of the worm independently of one another within certain limits. This choice, which is free within certain limits, of the modifications on the left and right flanks is due to the fact that the above-described corrections of the relative position do not all act equally on the left and right flanks. A change of the axial spacing, for example, results in a modification on the left and right flanks with the same sign; in the case of a symmetrical cylindrical worm also with the same amount. A change of the angle of rotation of the worm, in contrast, results in a modification on the left and right flanks with different signs; in the case of a symmetrical cylindrical worm with the same amount. The axial spacing and the angle of rotation of the worm can thus be set, for example, such that the desired modifications $f_{d1}$ and $f_{tr1}$ are achieved along the current contact line. This can generally be described as follows: If the machine has a movement apparatus which is usable during the dressing process, which has the coordinates $B_1, \ldots, B_{N_A}$ and which can change the relative position between the worm and the dressing wheel such that such corrections of the relative position are possible which allow a free choice of the modifications on the left and right flanks, corrections $\Delta B_1, \ldots, \Delta B_{N_A}$ of these coordinates are dependent on $f_{d1}$ and $f_{tr1}$ in comparison with a dressing of a non-modified worm:

$$\Delta B_i = \Delta B_i(f_{d1}, f_{tr1}) \text{ where } 1 \leq i \leq N_A. \quad (19)$$

If a worm is dressed in a non-modified state, only the axial position of the worm $z_S$ is changed, as described above. This position is set by the coordinates $B_1, \ldots, B_{N_A}$ which are thus a function of $z_S$ for the case:

$$B_i = B_i(z_S) \text{ where } 1 \leq i \leq N_A. \quad (20)$$

It follows from the last two relationships for the coordinates $B_1, \ldots, B_{N_A}$ on the dressing of a worm having the modifications described here:

$$B_i = B_i(z_S) + \Delta B_i(f_{d1}, f_{tr1}) \text{ where } 1 \leq i \leq N_A. \quad (21)$$

The corrections of the coordinates $\Delta B_1, \ldots, \Delta B_{N_A}$ generally also cause, in addition to the modification on the worm, a slight displacement of the position of the current contact line with respect to the dressing of a non-modified worm. Equation (18) thus has to be expanded by a dependency of $\Delta B_1, \ldots, \Delta B_{N_A}$ for the dressing of modified worms:

$$X_{F1}=X_{F1}(z_S, \Delta B_1, \ldots, \Delta B_{N_A}) \quad (22)$$

Worms are required for the method described here which have a modification as described in equation (1), where the direction $\rho_F$ is predefined by the direction of the contact line during dressing $\rho_{F1}$. The function $F_{F1}$ is, however, a freely predefinable continuous function within certain limits. The above-defined modifications $f_{d1}$ and $f_{tr1}$ describe a constant modification along the direction defined by $\rho_{F1}$ with a specific position of the contact line $X_{F1}$ and thus exactly correspond to the functions $F_{d1}(X_{l1})$ and $F_{tr1}(X_{r1})$ for the left and right flanks.

If the modifications $F_{d1}(X_{l1})$ and $F_{tr1}(X_{r1})$ are known, they can be inserted together with equation (19) in equation (22):

$$X_{F1}=X_{F1}(z_S, \Delta B_1(F_{d1}(X_{l1}), F_{tr1}(X_{r1})), \ldots, \Delta B_{N_A}(F_{d1}(X_{l1}), F_{tr1}(X_{r1}))) \quad (23)$$

The positions of the contact line $X_{F1}$ can be calculated, generally numerically, at a given axial position of the worm z using this equation system. The required corrections of the coordinates $\Delta B_i, \ldots, \Delta B_{N_A}$ can thus then be determined using equation (19). This calculation is carried out for all $z_S$ which are required to sweep over the part of the worm to be dressed with the contact lines on the left and right flanks.

The method presented here for the two-flank dressing can be directly transferred to the single-flank dressing. In this case, the equations for the left and right flanks decouple completely and the calculation can be carried out separately for each flank.

To be able to determine the required axis corrections $\Delta K_{BR}$ in accordance with equation (13) or the axis corrections $\Delta B_1, \ldots, \Delta B_{N_A}$ in accordance with the physical axles of the machine, it is necessary to be able to determine which profile, in particular which profile modification, is produced on the flanks of the worm with a given dresser and with given axial corrections $\Delta K_{BR}$. The case will first be looked at here in which axis corrections are fixedly set during the dressing process and only $z_S$ and $\varphi_S$ are moved coupled in accordance with the lead of the worm. The modification, defined as a deviation in the normal direction with respect to the tooth flank, in dependence on the axis corrections, is designated by $f_{nF1}(w_{F1}; \Delta K_{BR})$ here. The calculation of $f_{nF1}(w_{F1}; \Delta K_{BR})$ can be carried out, for example, with the aid of a dressing simulation. Inputs into such dressing simulations are, in addition to the dresser geometry and the dressing kinematics, as a rule also the geometry of the worm prior to dressing. The worm prior to the dressing is selected in the following approach such that it has a positive stock everywhere on the thread with respect to the worm after the dressing. In such dressing simulations, the dressing process is typically divided into a finite number of time steps and where material is removed at the worm by the dresser is then determined for each point in time.

A possible algorithm which is able to deliver all the information required later will be presented in detail here. For this purpose, a worm is first looked at which is not modified as a rule. Vectors in the normal direction having a previously fixed length are placed on individual points having the coordinates ($w_{F1}$, $z_{F1}$) on the threads of this worm. The length of the vectors corresponds to the stock of the worm before the dressing, with reference to the non-modified worm. The stock is typically selected to be so large that each vector is shortened at least once during the simulation described in the following. The number of points on the threads determines the accuracy of the result. These points are optionally selected as equidistant. The relative position of the worm to the dresser is specified at each point in time, for example by the coordinates of the uncorrected kinematics $\varphi_S$, $\gamma_B$, d, $y_A$ and their corrections $\Delta K_{BR}$. The intersection of all vectors with the dresser is calculated at each of the discrete times. If a vector does not intersect the dresser, it remains unchanged. If it, however, intersects the dresser, the point of intersection is calculated and the vector is shortened so much that it ends just at the point of intersection. The distance of the point of intersection from the dresser axis, that is the radius on the dresser $r_A$ of the point of intersection, is furthermore calculated and is stored as additional information to the just shortened vector. Since the corrections of the coordinates are not changed during the dressing here, all the vectors on a given radius of the worm $r_{F1}$ or on a given generating path $w_{F1}$ have approximately the same length after the simulation was carried out over the total width of the worm. This length corresponds to the modification $f_{nF1}$ of the worm dependent on the corrections $\Delta K_{BR}$.

The slight differences in the lengths are due to the fact that the algorithm described here causes feed markings due to the discretization of the time. These feed markings, and thus also the differences in the lengths of the vectors on a given radius of the worm, can be reduced by a finer discretization of the time, equivalent to a shortening of the time steps. If the simulation is not carried out over the total width of the worm, but is rather aborted at a given axial shift position $z_S$ of the worm, only the vectors which were already swept over by the contact line of the dresser and the worm have approximately the same length for a given radius on the worm. The remaining vectors either have the originally selected length or were already shortened at least once, but do not yet have the final length since they will be shortened again at a later time. This fact can be used to determine the contact line very exactly for the given dresser and for the given relative position of the worm with respect to the dresser, described by $\Delta K_{BR}$. All the vectors on a given radius on the worm $r_{F1}$ or on the generating path $w_{F1}$ are observed for this purpose and it is determined at which width line position the transition is from vectors having approximately the same length to those having a length differing therefrom. The contact line can thus be described by a function $b_{BRF1}$ or $b_{BwF1}$, depending on the corrections $\Delta K_{BR}$ and $z_S$.

$$z_{F1}=b_{BRF1}(r_{F1};z_S,\Delta K_{BR}) \text{ or } z_{F1}=b_{BwF1}(w_{F1};z_S,\Delta K_{BR}) \tag{24}$$

For involute worms, the contact line can be described in a very good approximation by a straight line in the coordinates ($w_{F1}$,$z_{F1}$)

$$w_{F1}\sin\rho_{F1}(\Delta K_{BR})+z_{F1}\cos\rho_{F1}(\Delta K_{BR})=X_{F1}(z_S,\Delta K_{BR}) \tag{25}$$

with $\rho_{F1}(\Delta K_{BR})$ describing the direction and $X_{F1}(z_S,\Delta K_{BR})$ the position of the straight line. The dependency of the direction $\rho_{F1}(\Delta K_{BR})$ on the corrections $\Delta K_{BR}$ is only small so that the direction can be assumed in a still a good approximation as only given by the worm geometry and dresser geometry.

If the vectors are determined along which the contact line extends, the radii on the dresser $r_{FA}$ previously stored for them can be read out and it can thus be determined for each radius on the worm $r_{F1}$ by which radius on the dresser $r_{FA}$ it was dressed. This association depends on the corrections $\Delta K_{BR}$.

$$r_{FA}=r_{FA}(r_{F1};\Delta K_{BR}) \tag{26}$$

The accuracy with which the contact line and the association of the radii can be determined in this manner depends both on the selected distance of the points and also on the length of the discrete time steps. Both values can theoretically be selected as small as desired, but in practice they are limited by the available RAM and the maximum acceptable computing time. This calculation is possible in practice with sufficient accuracy using the PCs available today with multiple gigabyte RAM and very fast multi-core systems.

A modification $f_{nF1}$ at a point on the worm, defined in the normal direction on the worm thread surface, results in a modification $f_{nF2}=f_{nF1}$ on the workpiece, defined in the normal direction on the tooth flank surface, at the corresponding point on the workpiece. Modifications on gears are typically defined in the transverse section ($f_{Ft}$), not in the normal direction ($f_{Fn}$). However, it is easy to convert between these two definitions of the modifications.

$$f_{Fn}=f_{Ft}\cdot\cos\beta_{bF} \tag{27}$$

In order, as described in equation (19), to determine a set of axis corrections $\Delta B_1, \ldots, \Delta B_{N_A}$ from $f_{nl1}$ and $f_{nr1}$, $f_{nF1}(w_{F1};\Delta K_{BR})=f_{nF1}$ can then be resolved simultaneously for the left and right flanks.

Cylindrical Tool and Cylindrical Workpiece

It is shown in the following for the case of a cylindrical tool and of a cylindrical workpiece how a pure profile modification can be produced in axial generating grinding with the aid of a worm which has a modification in accordance with equation (1). For this purpose, the progression of the contact point between the workpiece and the worm will first be described in dependence on the axial feeds $z_{V1}$ and $z_{V2}$. This progression depends on the base circle radii and on the base helix angles of the workpiece and of the worm and on the center distance d and on the axial cross angle $\gamma$. The relative position of the workpiece to the worm is described by equation (4) in this observation. This progression can be described mathematically as a relationship (R6) between the position in the width line direction ($z_F$) and the generating path ($w_F$) for the worm (index 1) and for the workpiece (index 2), as follows:

$$z_{F1}=C_{Fw1}\cdot w_{F1}-z_{V1}+C_{Fc1} \tag{28}$$

$$z_{F2}=C_{Fw2}\cdot w_{F2}-z_{V2}+C_{Fc2} \tag{29}$$

The coefficients $C_{Fw1}$, $C_{Fc1}$, $C_{Fw2}$ and $C_{Fc2}$ introduced here have the following dependencies:

$$C_{Fw1}=C_{Fw1}(\beta_{bF1}) \tag{30}$$

$$C_{Fc1}=C_{Fc1}(\beta_{bF1},\beta_{bF2},r_{bF1},d,\gamma) \tag{31}$$

$$C_{Fw2}=C_{Fw2}(\beta_{bF2}) \tag{32}$$

$$C_{Fc2}=C_{Fc2}(\beta_{bF1},\beta_{bF2},r_{bF2},d,\gamma) \tag{33}$$

This relationship shows that there is a linear relationship between $z_F$, $w_F$ and $z_V$ both for the worm and for the workpiece.

If all the points on the workpiece having a fixed generating path $w_{F2}$ are looked at in the production process, all these points on the worm only contact points having a generating path $w_{F1}$ resulting from this. The relationship (R7) between the generating paths of contacting points on the worm and on the workpiece is given by:

$$\hat{C}_{Fw1}\cdot w_{F1}+\hat{C}_{Fw2}\cdot w_{F2}+\hat{C}_{Fc}=0 \tag{34}$$

The coefficients $\hat{C}_{Fw1}$, $\hat{C}_{Fw2}$ and $\hat{C}_{Fc}$ introduced here have the following dependencies:

$$\hat{C}_{Fw1} = \hat{C}_{Fw1}(\beta_{bF1}) \quad (35)$$

$$\hat{C}_{Fw2} = \hat{C}_{Fw2}(\beta_{bF2}) \quad (36)$$

$$\hat{C}_{Fc} = \hat{C}_{Fc}(\beta_{bF1}, r_{bF1}, \beta_{bF2}, r_{bF2}, d, \gamma) \quad (37)$$

The relationships just presented follow directly from an analytical calculation of the contact points of two involute gearings which are oriented with respect to one another in accordance with the kinematic chain from equation (4).

It is now the basic idea of the present disclosure to utilize the above relationships to associate a point on the worm with every point on the workpiece. The fact is utilized here that the worm can have any desired modification within certain limits in accordance with equation (1) and a profile modification should be produced on the workpiece.

For this purpose, a generating path $w_{F2}$ on the workpiece is looked at for a given shift position $z_{V1}$ of the worm. The generating path $w_{F1}$ on the worm can be determined from this using equation (34); with using equation (28) the width line position $z_{F1}$. Each generating path on the workpiece will thus map to a point on the contact path on the worm independently of $z_{V2}$. $X_{F1}$ can be determined from $w_{F1}$ and $z_{F1}$ using equation (2) and thus $w_{F2}$ can be mapped to $X_{F1}$. The following results for the required modification $F_{Ft1}$ on the worm:

$$F_{Ft1}(X_{F1}) = -\frac{\cos\beta_{bF2}}{\cos\beta_{bF1}} \cdot f_{Ft2}(w_{F2}) \quad (38)$$

For a given $z_{V1}$, it follows from equation (28)

$$z_{F1} C_{Fw1} \cdot w_{F1} = \text{const} \quad (39)$$

which is equivalent to the fact that the contact path on the worm is not shifted during a stroke.

Figure 2:
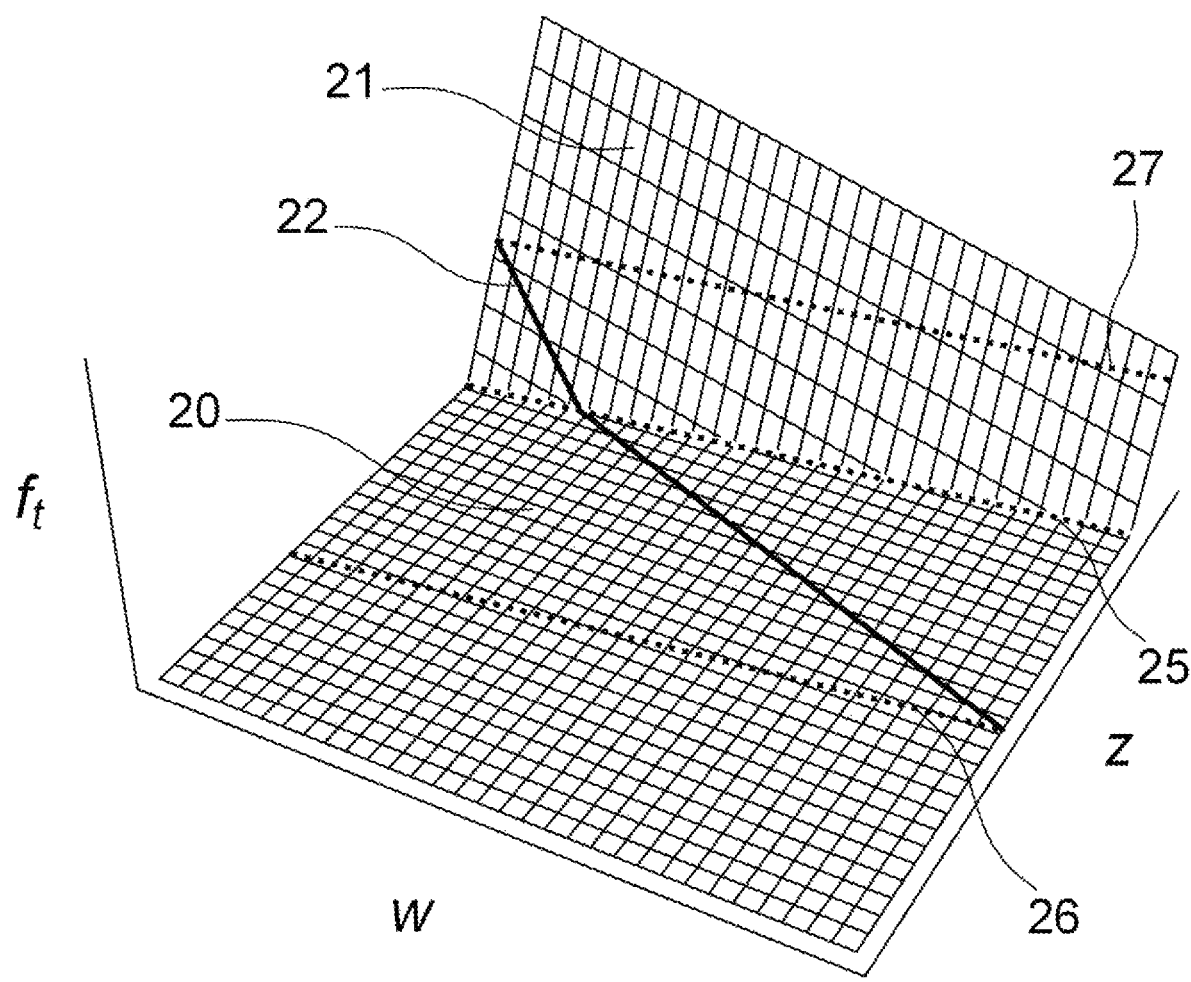
FIG. 2 shows by way of example the topological surface modification on an involute worm which is necessary to produce a linear tip relief on the workpiece with the method described herein. 22 marks the contact path; 25, 26, and 27 indicate different contact lines between the dresser and the worm.

The principle should now be shown in an illustrative manner with the help of FIG. 2 for the example of a linear tip relief without a transition region. The Figure shows the topological surface modification of a worm, applied over w and z. 22 marks the contact path along which the worm has theoretical point contact with the workpiece. The region 20 on the worm is not modified; the region 21 is modified, with $F_{Ft1}$ being a linear function in $X_{F1}$. The contact line 26 between the dresser and the worm is given by the $X_{F1}$ which corresponds to the generating path $w_{F2}$ at the utilizable root circle of the workpiece. This contact line intersects the contact path 22 at the point on the worm which machines the utilizable root circle of the gearing. Analogously, the contact line 27 intersects the contact path 22 at the point on the worm which machines the utilizable tip circle of the workpiece and the contact line intersects the contact path 22 at the point on the worm which machines the kink at the start of the tip relief. It thereby becomes clear that the different diameters on the workpiece are produced by points on the worm which were dressed at different times and which can thus be modified differently.

Conical Tool and Cylindrical Workpiece

Generating grinding is to date only known with cylindrical worms. It is, however, also possible to use conical worms as the tool. The kinematics of this process can be described by a continuous generating gear train having a conical and a cylindrical wheel. These kinematics are described by the kinematic chain given in equation (5). As in the continuous generating gear train comprising two cylindrical wheels, there is also a theoretical point contact between both wheels. This allows the same approach to be used as for cylindrical tools, i.e. a worm having a modification in accordance with equation (1) is used in the diagonal generating method in order likewise to produce a modification in accordance with equation (1) on the workpiece. The progression of the contact point between the workpiece and the worm can be described mathematically as follows.

$$z_{F1} = C_{Fw1} \cdot w_{F1} + C_{FzV1} \cdot z_{V1} + C_{Fc1} \quad (40)$$

$$z_{F2} = C_{Fw2} \cdot w_{F2} + C_{FzV2} \cdot z_{V1} - z_{V2} + C_{Fc2} \quad (41)$$

The coefficients $C_{Fw1}$, $C_{Fc1}$, $C_{Fw2}$, $C_{FzV1}$, $C_{FzV2}$ and $C_{Fc2}$ introduced here have the following dependencies:

$$C_{Fw1} = C_{Fw1}(\beta_{bF1}) \quad (42)$$

$$C_{Fc1} = C_{Fc1}(\beta_{bF1}, \beta_{bF2}, r_{bF1}, d, \gamma, \theta_1) \quad (43)$$

$$C_{Fw2} = C_{Fw2}(\beta_{bF2}) \quad (44)$$

$$C_{Fc2} = C_{Fc2}(\beta_{bF1}, \beta_{bF2}, r_{bF2}, d, \gamma, \theta_1) \quad (45)$$

$$C_{FzV1} = C_{FzV1}(\beta_{bF1}, \beta_{bF2}, r_{bF1}, d, \gamma, \theta_1) \quad (46)$$

$$C_{FzV2} = C_{FzV2}(\beta_{bF1}, \beta_{bF2}, r_{bF2}, d, \gamma, \theta_1) \quad (47)$$

Equation (34) is replaced with $$\hat{C}_{Fw1} \cdot w_{F1} + \hat{C}_{Fw2} \cdot w_{F2} + \hat{C}_{FzV1} \cdot z_{V1} + \hat{C}_{Fc} = 0 \quad (48)$$

The coefficients $\hat{C}_{Fw1}$, $\hat{C}_{Fw2}$, $\hat{C}_{FzV1}$ and $\hat{C}_{Fc}$ introduced here have the following dependencies:

$$\hat{C}_{Fw1} = \hat{C}_{Fw1}(\beta_{bF1}) \quad (49)$$

$$\hat{C}_{Fw2} = \hat{C}_{Fw2}(\beta_{bF2}) \quad (50)$$

$$\hat{C}_{FzV1} = \hat{C}_{FzV1}(\beta_{bF1}, r_{bF1}, \beta_{bF2}, r_{bF2}, \gamma, \theta_1) \quad (51)$$

$$\hat{C}_{Fc} = \hat{C}_{Fc}(\beta_{bF1}, r_{bF1}, \beta_{bF2}, r_{bF2}, d, \gamma, \theta_1) \quad (52)$$

With knowledge of these relationships, a mapping of points on the worm to points on the workpiece can be calculated in an analog manner to the case of cylindrical tools and workpieces. If a modification on the worm in accordance with equation (1) is again assumed here, $F_{Ft1}$ can be determined analogously to the purely cylindrical case such that a pure profile modification $f_{Ft2}$ is produced on the workpiece. The corresponding $X_{F1}$ can be calculated for this purpose analogously for each $w_{F2}$ using the above relationships.

Cylindrical Tool and Conical Workpiece

The method described here can be transferred to the generating grinding of conical workpieces, with grinding here generally having to be carried out with the diagonal generating method. The case of a cylindrical worm is first looked at here which has a modification in accordance with equation (1). The worm and the workpiece again form a continuous generating gear train whose kinematics are given by equation (6). There is again also a theoretical point contact between the worm and the workpiece. The progression of the contact point between the workpiece and the worm can be described mathematically as follows.

$$z_{F1} = C_{Fw1} \cdot w_{F1} - z_{V1} + C_{FzV2} \cdot z_{V2} + C_{Fc1} \quad (53)$$

$$z_{F2} = C_{Fw2} \cdot w_{F2} + C_{FzV2} \cdot z_{V2} + C_{Fc2} \quad (54)$$

The coefficients $C_{Fw1}$, $C_{Fc1}$, $C_{Fw2}$, $C_{FzV2}$, $C_{FzV1}$ and $C_{Fc2}$ introduced here have the following dependencies:

$$C_{Fw1} = C_{Fw1}(\beta_{bF1}) \quad (55)$$

$$C_{Fc1} = C_{Fc1}(\beta_{bF1}, \beta_{bF2}, r_{bF1}, d, \gamma, \theta_2) \quad (56)$$

$$C_{Fw2} = C_{Fw2}(\beta_{bF2}) \tag{57}$$

$$C_{Fc2} = C_{Fc2}(\beta_{bF1}, \beta_{bF2}, r_{bF2}, d, \gamma, \theta_2) \tag{58}$$

$$C_{Fz_{V2}2} = C_{Fz_{V2}2}(\beta_{bF1}, \beta_{bF2}, r_{bF2}, d, \gamma, \theta_2) \tag{59}$$

$$C_{Fz_{V2}1} = C_{Fz_{V2}1}(\beta_{bF1}, \beta_{bF2}, r_{bF1}, d, \gamma, \theta_2) \tag{60}$$

Equation (34) is replaced with:

$$\hat{C}_{Fw1} \cdot w_{F1} + \hat{C}_{Fw2} \cdot w_{F2} + \hat{C}_{Fz_{V2}} \cdot z_{V2} + \hat{C}_{Fc} = 0 \tag{61}$$

The coefficients $\hat{C}_{Fw1}$, $\hat{C}_{Fw2}$, $\hat{C}_{Fz_{V2}}$ and $\hat{C}_{Fc}$ introduced here have the following dependencies:

$$\hat{C}_{Fw1} = \hat{C}_{Fw1}(\beta_{bF1}) \tag{62}$$

$$\hat{C}_{Fw2} = \hat{C}_{Fw2}(\beta_{bF2}) \tag{63}$$

$$\hat{C}_{Fz_{V2}} = \hat{C}_{Fz_{V2}}(\beta_{bF1}, r_{bF1}, \beta_{bF2}, r_{bF2}\gamma, \theta_2) \tag{64}$$

$$\hat{C}_{Fc} = \hat{C}_{Fc}(\beta_{bF1}, r_{bF1}, \beta_{bF2}, r_{bF2}, d, \gamma\theta_2) \tag{65}$$

In the case of conical workpieces, equation (53) shows that the relationship between $z_{F1}$, $w_{F1}$ and $z_{V1}$ additionally has a dependency on $z_{V2}$. This has the result that equation (39) generally no longer applies to a fixed $z_{V1}$ and $z_{F1} - C_{Fw1} \cdot w_{F1}$ depends on $z_{V2}$, whereby the contact path is shifted during a stroke on the worm. In order to hold the contact path fixed on the worm in accordance with the present disclosure, the diagonal generating grinding can be applied in which $z_{V1}$ depends linearly on $z_{V2}$ during a stroke. If grinding is performed with a constant diagonal ratio, $z_{V1}$ is a function of $z_{V2}$ and the following relationship applies:

$$z_{V1}(z_{V2}) = K_{Z_{V1}} \cdot z_{V2} + z_{V01} \tag{66}$$

$K_{Z_{V1}}$ in this respect is a diagonal ratio and $z_{V01}$ is a fixed offset which makes it possible to position the modifications described here at different points one the worm or to select the region on the worm which is to be used. If $K_{Z_{V1}} \neq 0$, a diagonal generating method is spoken of. $K_{Z_{V1}} = C_{Fz_{V2}1}$ follows directly from equation (53) to achieve a contact path not shifted. Generally, however, a different diagonal ratio for the left and right flanks results through this condition. A generating grinding is thus first only possible on one flank using the method in accordance with the present disclosure.

If $z_{V1}$ in accordance with equation (66) is replaced in equation (53), a relationship between $z_{F1}$ and $w_{F1}$ results independently of $z_{v2}$ such that the calculation approach shown above again delivers a relationship between $w_{F2}$ and $X_{F1}$. In the case of conical workpieces, this relationship is, however, generally no longer independent of $z_{F2}$, which follows from the dependency of the relationship in equation (61) on $z_{v2}$ which can be eliminated by equation (54). It is, however, usual due to the taper that the desired position of a profile modification on the workpiece is shifted over the gearing width. The desired start of a tip relief at the heel is thus, for example at a larger generating path than at the toe. It directly results from the above equations that the relationship between $w_{F2}$, $z_{F2}$ and $X_{F1}$ is linear; the start of a tip relief which is produced with the method described here would thus, for example, change linearly in the generating path over the width of the workpiece and the start of the tip relief thus describes a straight line in a w-z diagram of the workpiece. The direction of this straight line can be influenced by the macrogeometry of the worm, in particular of the profile angle. Such a profile angle change of the worm is possible as long as the worm and the workpiece continue to mesh with one another. Another possibility to directly influence the direction of this straight line would be the use of a diagonal generating method in which the contact path on the worm is shifted during a stroke and thus different regions of the worm are used which are optionally differently modified. Such a method is described in DE10 2015 000 907. Such a modification on the workpiece would then be treated as a triangular end relief.

A two-flank grinding of a conical workpiece is made possible by the use of a conical tool.

Conical Tool and Conical Workpiece

The calculation for a conical tool and a conical workpiece takes place analog to the previously discussed combinations. The worm and the workpiece again form a continuous generating gear train whose kinematics are given by equation (7). There is again also a theoretical point contact between the worm and the workpiece. The progression of the contact point between the workpiece and the worm can be described mathematically as follows.

$$z_{F1} = C_{Fw1} \cdot w_{F1} + C_{Fz_{V1}1} \cdot z_{V1} + C_{Fz_{V2}1} \cdot z_{V2} + C_{Fc1} \tag{67}$$

$$z_{F2} = C_{Fw2} \cdot w_{F2} + C_{Fz_{V1}2} \cdot z_{V1} + C_{Fz_{V2}2} \cdot z_{V2} + C_{Fc2} \tag{68}$$

The coefficients $C_{Fw1}$, $C_{Fc1}$, $C_{Fw2}$, $C_{Fz_{V2}2}$, $C_{Fz_{V2}1}$, $C_{Fz_{V1}2}$, $C_{Fz_{V1}1}$ and $C_{Fc2}$ introduced here have the following dependencies:

$$C_{Fw1} = C_{Fw1}(\beta_{bF1}) \tag{69}$$

$$C_{Fc1} = C_{Fc1}(\beta_{bF1}, \beta_{bF2}, r_{bF1}, d, \gamma\theta_1, \theta_2) \tag{70}$$

$$C_{Fw2} = C_{Fw2}(\beta_{bF2}) \tag{71}$$

$$C_{Fc2} = C_{Fc2}(\beta_{bF1}, \beta_{bF2}, r_{bF2}, d, \gamma, \theta_1, \theta_2) \tag{72}$$

$$C_{Fz_{V2}2} = C_{Fz_{V2}2}(\beta_{bF1}, \beta_{bF2}, r_{bF2}, d, \gamma, \theta_1, \theta_2) \tag{73}$$

$$C_{Fz_{V2}1} = C_{Fz_{V2}1}(\beta_{bF1}, \beta_{bF2}, r_{bF1}, d, \gamma, \theta_1, \theta_2) \tag{74}$$

$$C_{Fz_{V1}2} = C_{Fz_{V1}2}(\beta_{bF1}, \beta_{bF2}, r_{bF2}, d, \gamma, \theta_1, \theta_2) \tag{75}$$

$$C_{Fz_{V1}1} = C_{Fz_{V1}1}(\beta_{bF1}, \beta_{bF2}, r_{bF1}, d, \gamma, \theta_1, \theta_2) \tag{76}$$

Equation (34) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{Fz_{V2}} \cdot z_{V2} + \hat{C}_{Fc} = 0 \tag{77}$$

The coefficients $\hat{C}_{Fw1}$, $\hat{C}_{Fw2}$, $\hat{C}_{Fz_{V1}}$, $\hat{C}_{Fz_{V2}}$ and $\hat{C}_{Fc}$ introduced here have the following dependencies:

$$\hat{C}_{Fw1} = \hat{C}_{Fw1}(\beta_{bF1}) \tag{78}$$

$$\hat{C}_{Fw2} = \hat{C}_{Fw2}(\beta_{bF2}) \tag{79}$$

$$\hat{C}_{Fz_{V1}} = \hat{C}_{Fz_{V1}}(\beta_{bF1}, r_{bF1}, \beta_{bF2}, r_{bF2}, \gamma, \theta_1, \theta_2) \tag{80}$$

$$\hat{C}_{Fz_{V2}} = \hat{C}_{Fz_{V2}}(\beta_{bF1}, r_{bF1}, \beta_{bF2}, r_{bF2}\gamma, \theta_1, \theta_2) \tag{81}$$

$$\hat{C}_{Fc} = \hat{C}_{Fc}(\beta_{bF1}, r_{bF1}, \beta_{bF2}, r_{bF2}, d, \gamma, \theta_1, \theta_2) \tag{82}$$

Equation (67) also shows an additional dependency on $Z_{V2}$ for conical tools so that a non-shifted contact path can again only be achieved by a diagonal generating grinding. It follows for the diagonal ratio from equation (67) $K_{Z_{V1}} = C_{Fz_{V2}1}/C_{Fz_{V1}1}$. The calculation approach for cylindrical tools and conical workpieces can thus again be applied which is here also again with respect to a relationship between $w_{F2}$ and $X_{F1}$ which is again generally no longer independent of $z_{F2}$. The points which are associated with the same $X_{F1}$ are here also on a straight line, whereby the generally desired shift of the position of the profile modification over the gearing width in the w-z diagram is achieved with conical gearings. The direction of this straight line can here be influenced by changing the profile angle of the worm and/or by changing the conical angle $\theta_1$ of the worm.

The calculated diagonal ratio for the left and right flanks generally here also differs so that only a single-flank grinding is possible. It is, however, possible to select the geometry of the worm, in particular of the conical angle $\theta_1$, and/or the profile angle of the worm such that the diagonal ratio is the same for both sides, whereby a two-flank grinding becomes possible. The conical angle $\theta_1$ in particular influences the diagonal ratio differently on both sides. The dependency of the diagonal ratio on the geometry of the tool results from the corresponding dependencies of the coefficients $C_{Fz_{V2}1}$ and $C_{Fz_{V1}1}$.

The transition to the diagonal generating grinding with a deviating diagonal ratio here also provides a further possibility which is likewise described in DE 10 2015 000 907.

Calculation Approach for Calculating the Contact Paths on the Tool and on the Workpiece In the following, a calculation approach will be shown with which the above-used contact paths can be calculated in dependence on the feeds. This calculation of the contact between the workpiece and the tool is carried out with the aid of two theoretical racks (also called basic racks), one each for the workpiece and the tool, each having trapezoidal, generally asymmetrical profiles which can generate the gearings. Since both the tool and the workpiece are involute gearings, this observation is symmetrical with respect to a swapping over of the tool and workpiece.

Figure 6:
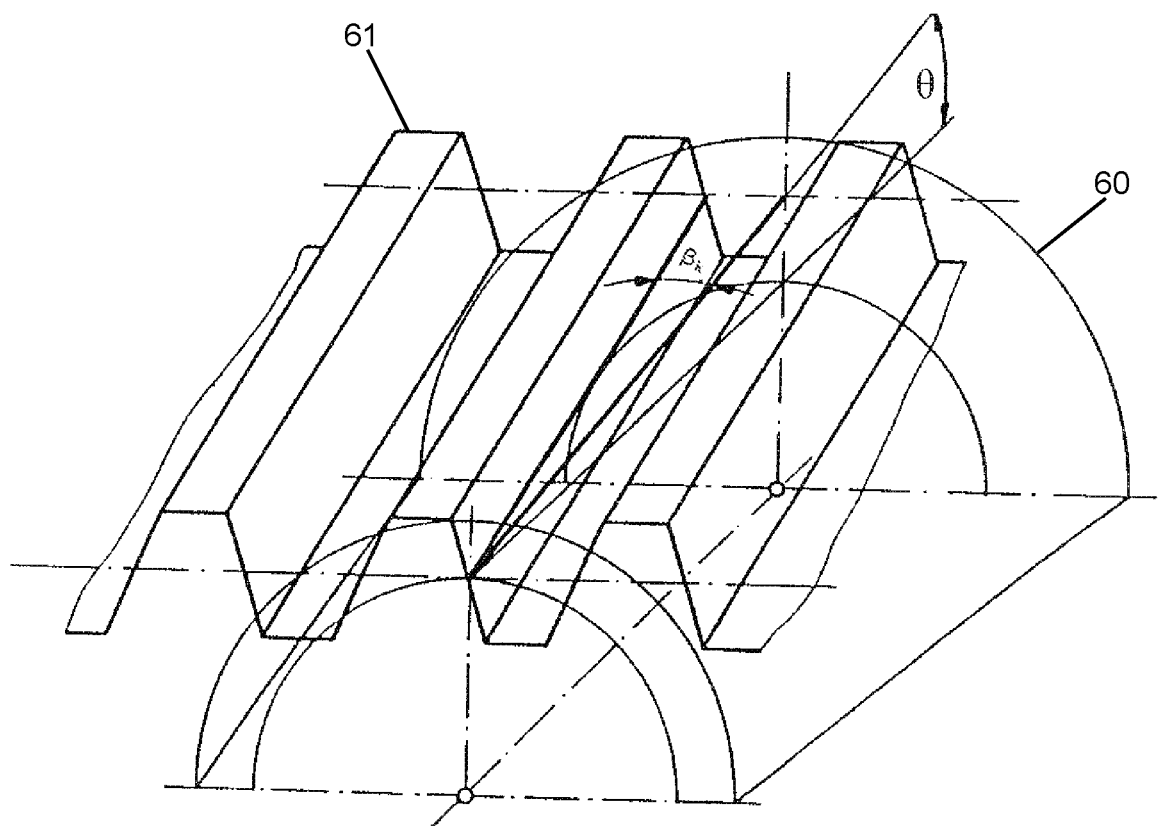
FIG. 6 shows a representation of a conical gearing 60 having a rack 61 generating the gears. The rack is pivoted by the helix angle $\beta_k = \beta_w$ and is tilted by the conical angle $\theta = \theta$. (From Zierau, S: Die geometrische Auslegung konischer Zahnräder und Paarungen mit parallelen Achsen [The Geometrical Design of Conical Gears and Pairs Having Parallel Axes], Report No. 32, Institute For Construction Science, Braunschweig Technical University).
Figure 7:
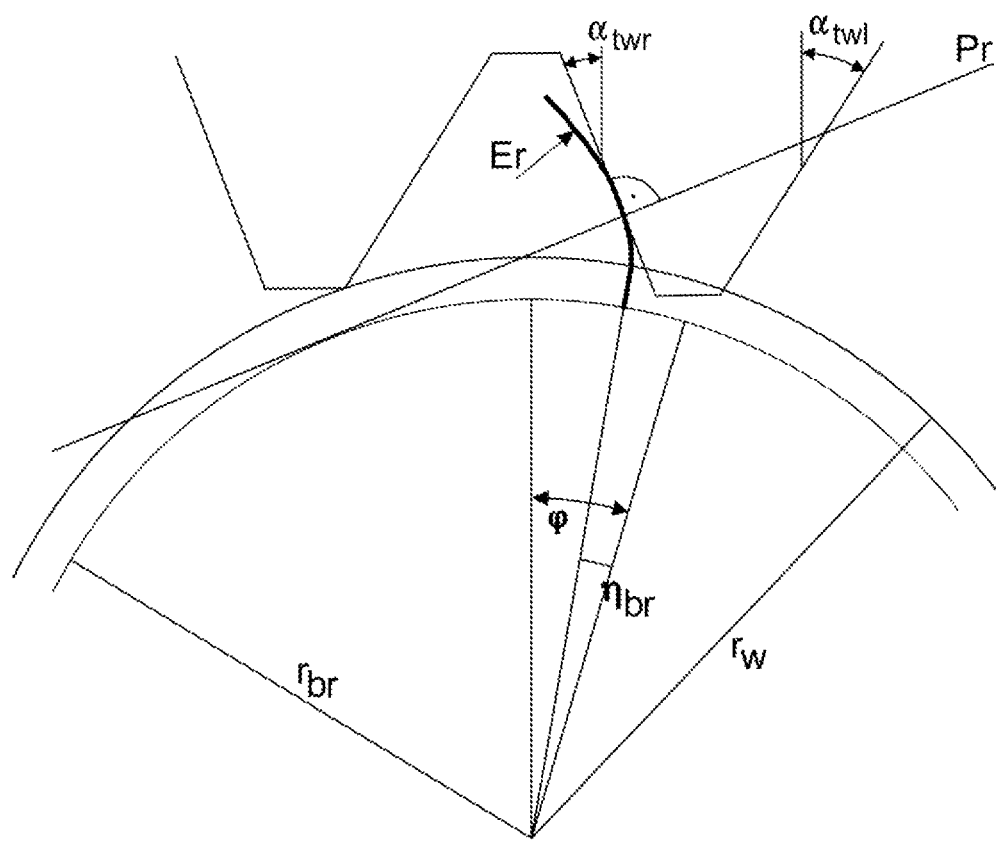
FIG. 7 shows the engagement of a right flank $E_r$ with a generating asymmetrical rack in the transverse section. The profile angle in the transverse section $\alpha_{twr}$ defines the inclination of the engagement planes $P_r$. The gearing is rotated by the angle of rotation $\varphi$.

FIG. 7 shows by way of example the contact of a right involute flank with a generating rack with a profile angle $\alpha_{twr}$ in the transverse section. The gearing is rotated by the angle of rotation $\varphi$. The contact between the flank and the rack takes place in the engagement plane $P_r$ which is inclined by $\alpha_{twr}$. The contact point between the flank and the rack results for all angles of rotation $\varphi$ as the point of intersection between the flank and the engagement plane. While the gearing rotates, the rack is horizontally displaced so that it rolls off the pitch circle with a radius $r_w$ without slippage. The flank and the rack thereby remain in contact. To describe the gearing in its whole width, the relative position of the rack to the gearing has to be observed in 3D. It is pivoted by the helix angle $\beta_w$ for cylindrical gearing. For the case of a conical gearing, the position of the rack to the gearing is described exhaustively in (Zierau) (The Geometrical Design of Conical Gears and Pairs Having Parallel Axes, Report No. 32, Institute For Construction Science, Braunschweig Technical University). In addition to the pivoting by the helix angle $\beta_w$, a tilt takes place by the conical angle $\theta$ (see FIG. 6). In both cases, the rack has the profile angle $\alpha_{nwF}$ in the normal section. Which combinations of angles $\alpha_{twF}$, $\alpha_{nwF}$ and $\beta_w$ as well as of the normal module $m_n$ and the transverse module $m_t$ are possible to produce a given gearing results for cylindrical gearings from the set of formulas of DIN 3960 and for conical gearings additionally from the set of formulas from [Zierau]. The formulas required for this can be transferred directly to asymmetrical gearings by introducing different profile angles at the left and right sides.

If the geometry and the relative position of the rack to the gearing are known, the transverse sections can be determined for any desired width positions and within them the contact point between the rack and the flank. All these contact points in the individual transverse sections form a straight line (straight contact line) in the engagement plane for an angle of rotation $\varphi$. If these contact points are described via w and z from the parameterization in equation (3), a linear relationship (R1) between w, z and $\varphi$ is obtained. If the rack is held fast in space, it is possible for cylindrical gearings to displace them in the axial direction. This axial feed $z_V$ is typically set for the workpiece to machine it over the total toothed width and is set for the tool to set the diagonal ratio. So that the gearing continues to contact the rack, at two flanks as a rule, the gearing has to be rotated about its axis in addition to the shift. The amount of the rotation results from the lead of the gearing and from the amount of the shift, the rotational sense from the hand of thread. With conical gearings, the feed $z_V$ does not take place in the axial direction, but rather tilted by the conical angle $\theta$ with respect to it. The lead required for the calculation of the correction of the angle of rotation is calculated using the same formula as for cylindrical gearings from $\beta_w$ and $m_t$. The transverse sections are to be observed in dependence on the axial feed or the feed with the correspondingly corrected angles of rotation for calculating the contact points in the individual transverse sections. A linear relationship (R2) between w, z, $z_V$ and $\varphi$ results from (R1) for the description of the contact points.

Figure 5:
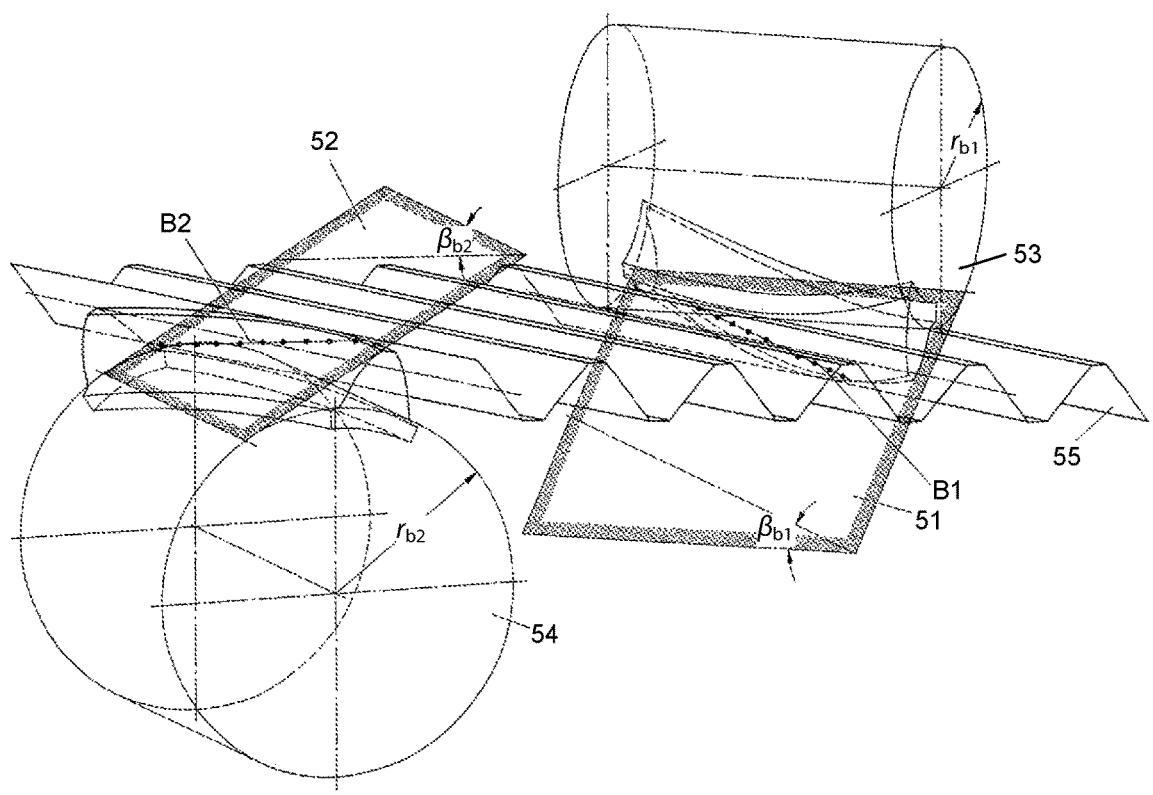
FIG. 5 shows a representation of two gearings (including gearing wheel 53 and gearing wheel 54) in a continuous generating gear train including a common rack 55 and the engagement planes of both gearings (engagement plane 51 for gearing wheel 53 and engagement plane 52 for gearing wheel 54). As shown, gearing wheel 53 contacts the common rack 55 at a contact line B1, and gearing wheel 54 contacts the rack at a contact line B2. Gearing wheel 53 has a radius $r_{b1}$, while gearing wheel 54 has a radius $r_{b2}$. Common rack is pivoted by the helix angles $\beta_{b1}$ and $\beta_{b2}$. For a better illustration, the relative position of the two gearings does not correspond to that in the continuous generating gear train. This Figure also shows the relative position of a cylindrical gearing to the generating rack. (From Niemann, G; Winter, H: Maschinenelemente Band 3 2. Auflage, [Machine Elements Vol. 3, 2nd Edition] Springer Verlag, Berlin, 1983).

If two sets of gearings are paired in a continuous generating gear train, their two racks have to be congruent at all times, as shown in FIG. 5. This implies that the profile angles $\alpha_{nwF}$ have to be equal for both sets of gearings. (R3) furthermore results from this: $\gamma + \beta_{w1} + \beta_{w2} = 0$. This condition allows the profile angles to be determined in the normal section or in the transverse section of the two racks from a given axial cross angle for two given sets of gearings which can mesh with one another. A change of the base circle radii and of the base helix angles of the worm is thus equivalent to a change of the profile angle and/or of the conical angle and/or of the axial cross angle.

So that the racks are congruent at all times, a linear constraint (R4) results between the two angles of rotation and the two feeds.

If the two angles of rotation and the two feeds are known, the contact point of the two sets of gear teeth can be determined directly by calculating the point of intersection of the two straight contact lines. The parameters $z_{F1}$ and $w_{F1}$ or $z_{F2}$ and $w_{F2}$, which describe the contact point on gearing 1 or gearing 2, depend linearly on $\varphi_1$, $\varphi_2$, $z_{V1}$ and $z_{V2}$ (R5). If the angles of rotation are eliminated in these relationships, the sought contact paths (R6) follow.

A linear relationship (R7) results between $w_{F1}$, $w_{F2}$, $z_{V1}$ and $z_{V2}$ from (R4) and (R2) for both sets of gearings by eliminating $\varphi_1$ and $\varphi_2$ and describes, in dependence on the feed, which generating path on gearing 1 contacts which generating path on gearing 2.

The following has to apply so that the tool and the workpiece mesh with one another:

$$m_{bF1} \cdot \cos \beta_{bF1} = m_{bF2} \cdot \cos \beta_{bF2} \tag{83}$$

Alternatively to the just described approach or involute gearings, it is also possible to carry out the contact paths (R6) and the relationship between the pitch angles (R7) with the aid of a simulation calculation. It is possible with such simulations to calculate the exact geometry of the workpiece from a given tool, in particular from a worm and from a given kinematics, in particular from a given relative position between the tool and the workpiece. Such simulations can be extended such that it is also possible to determine with them which point on the tool produces which point on the workpiece, in dependence on the feed of the tool and of the workpiece. In this path, no involute properties are used so that it can also be used for non-involute profiles. An algorithm suitable for this will be described in the following.

For this purpose, a workpiece is first looked at which is not modified as a rule. Vectors in the normal direction having a previously fixed length are placed on individual points having the coordinates $(w_{F2}, z_{F2})$ on the teeth of this workpiece. The length of the vectors corresponds to the allowance of the workpiece prior to grinding, with respect to the non-modified workpiece. The stock is typically selected to be so large that each vector is shortened at least once during the simulation described in the following. The number of points on the teeth determines the accuracy of the result. These points are optionally selected as equidistant. The relative position of the workpiece to the worm is specified at every time, for example by the kinematic chain $K_r$. The intersection of all vectors with the worm is calculated at each of the discrete times. If a vector does not intersect the worm, it remains unchanged. If it, however, intersects the worm, the point of intersection is calculated and the vector is shortened so much that it ends just at the point of intersection. The spacing of the point of intersection from the worm axis, that is the radius on the worm $r_{F1}$ of the point of intersection, is furthermore calculated and is stored as additional information to the just shortened vector. Since the corrections of the coordinates are not changed during the grinding here, all the vectors on a given radius of the workpiece $r_{F2}$ or on a given generating path $w_{F2}$ have approximately the same length after the simulation was carried out over the total width of the worm.

Figure 8:
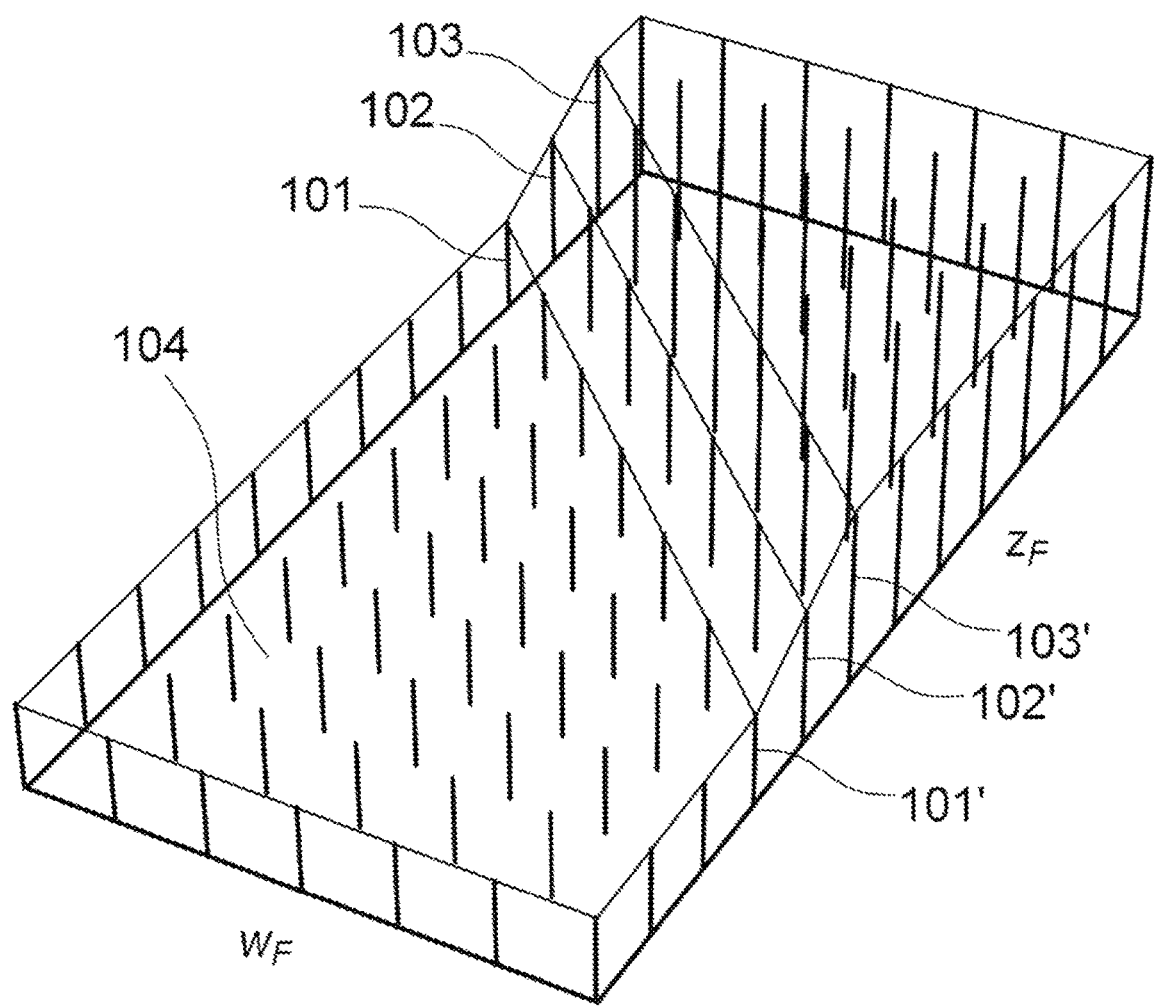
FIG. 8 schematically shows a section of the flank of a workpiece tooth with vectors in the normal direction for a workpiece not ground over the whole width. The number of vectors was considerably reduced here in comparison with a simulation calculation. The plane 104 shown schematically here corresponds to the generally curved flank of the non-modified workpiece onto which the vectors are placed. The vectors 101 and 101' were already swept over by the contact path and are thus completely shortened. The vectors 102 and 102' have already been shortened at least once, but have not yet been swept over by the contact path. The vectors 103 and 103' have not yet been shortened and thus still have the length corresponding to the selected allowance.

The slight differences in the lengths are due to the fact that the algorithm described here causes markings, similar to the generating cuts during generating, due to the discretization of the time. These markings, and thus also the differences in the lengths of the vectors on a given radius of the workpiece, can be reduced by a finer discretization of the time, equivalent to a shortening of the time steps. If the simulation is not carried out over the total width of the workpiece, but is rather aborted at a given axial shift position $z_{V2}$ of the workpiece, only the vectors which were already swept over by the contact path have approximately the same length for a given radius on the worm. The remaining vectors either have the originally selected length or were already shortened at least once, but do not yet have the final length since they will be shortened again at a later time (see FIG. 8). This fact can be utilized to determine the contact path for the current feeds of the workpiece and of the worm with great accuracy. All the vectors on a given radius on the workpiece $r_{F2}$ or on the generating path $w_V$ are observed for this purpose and it is determined at which width line positions the transition is from vectors having approximately the same length to those having a length differing therefrom. Since the continuous generating gear train is symmetrical with respect to the swapping over of the workpiece and the worm, the contact path on the worm can be determined in the same manner. If the workpiece and the worm are both cylindrical in the involute case, the coefficients from equation (28) or (29) can be determined, for example by means of curve fitting from the points on the contact path calculated in this manner. If the vectors are determined along which the contact path extends, the radii on the worm $r_{F1}$ previously stored for them can be read out and it can thus be determined for each radius on the workpiece $r_{F2}$ by which radius on the worm $r_{F1}$ it was ground. These radii can be converted into generating paths. The coefficients from equation (34) can be determined, for example by means of curve fitting, from these value pairs for cylindrical workpieces and cylindrical worms.

If the worm is conical and the workpiece is cylindrical in the involute case, the contact path for at least two different feeds $z_{V1}$ has to be determined in order additionally to determine the coefficients before $z_{V1}$ in the equations (40), (41) and (48). In an analog manner, at least two different feeds $z_{V2}$ have to be looked at when the workpiece is conical and the worm is cylindrical. If the workpiece and the worm are conical, the contact paths for at least two feeds $z_{V1}$ and at least two feeds $z_{V2}$ have to be looked at to determine all the coefficients from the equations (67), (68) and (77).

Superposition with Other Modifications

Modifications which are known from the prior art can be additively superposed without interference on the pure profile modifications which can be produced using the method described here. On the one hand, they are further pure profile modifications which can be stored in the used dresser. It is thus also possible, using a dresser which stores a profile modification, to produce a different free profile modification on the worm, and thus on the workpiece, within certain limits using the method described here. For this purpose, only the difference from the desired profile modification and from the profile modification stored in the dresser has to be produced with the method described here. For example, on the one hand, profile crownings can thus be changed or produced, but tip reliefs and/or root reliefs can also be freely generated, for example, independently of whether the dresser already stores them or which amount or which length they have.

If, for example, the dresser stores a profile crowning, a further profile crowning can be produced with the method described here so that the achieved profile crowning deviates from that on the dresser.

A further method known from the prior art [DE10208531] of producing modifications on gearings comprises correcting the kinematics during the grinding process. Such modifications can be implemented, for example, by changing the axial spacing and/or by correcting the angle of rotation and/or by correcting the feeds. Such corrections always have an effect along the contact path and have the same value along it. The modifications which can be produced by this method can thus also be described by equation (1). The direction given by $\rho_{KF}$ can, however, not be influenced in this method since it only depends on the base helix angle of the workpiece. This modification $f_{KFt}$ can be mathematically described as follows:

$$f_{KFt}(w_F, z_F) = F_{KFt}(w_F \tan \rho_{KF} + z_F) \tag{84}$$

In this respect, the functions $F_{KFt}$ can be any desired continuous functions. The required corrections of the grinding kinematics can be calculated from the functions $F_{KFt}$ for the left and right flanks. Naturally twisted crownings or also distorted end reliefs can, for example, be manufactured using this method.

Since no correction of the grinding kinematics is necessary in the present disclosure underlying this application, apart from the diagonal generating grinding or from the defined shift position on which grinding has to be carried out on cylindrical workpieces, a correction of the grinding kinematics and thus a modification in accordance with equation (84) can be additively superposed without interference.

Division and Utilization of the Tool

Figure 3:
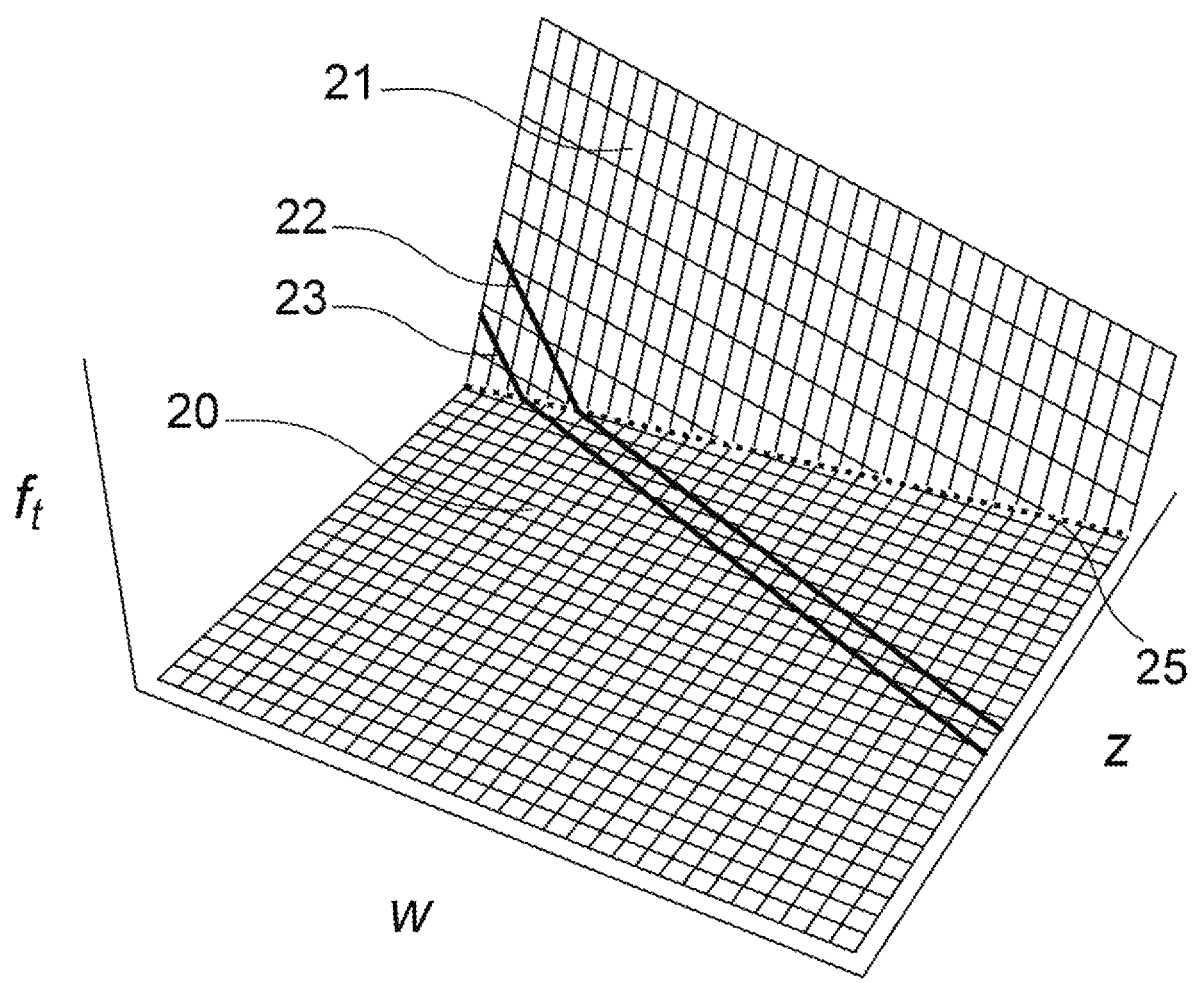
FIG. 3 shows the same topological surface modification as FIG. 2, but with an additional contact path 23 which is slightly offset with respect to 22, which corresponds to a different shift position during grinding.

To grind a workpiece using the method described here, a region is required on the worm having a certain width. This width corresponds per flank, as generally in axial generating grinding, to the extent of the contact path 22 in the width direction of the worm. If the method is applied to conical workpieces, grinding is admittedly diagonal, but the contact path is not shifted so that the width of the actually used region on the worm corresponds to that in axial generating grinding. To utilize the worm to the optimum, a plurality of such regions can be applied to the worm. However, there is only one contact path in each of these regions with which the profile modification can be exactly produced, whereby only a small part of the surface of the worm can be used. To be able to use the worm more efficiently, it is also possible by shifting the worm to utilize contact paths which are slightly shifted with respect to the ideal contact path. In the case of conical workpieces and the diagonal generating grinding required for this, the shifting corresponds to a change of the fixed offset ($z_{V01}$). In FIG. 3, 23 marks such a contact path offset with respect to the ideal contact path 22. If this is used in grinding, a shift of the profile modification results in the direction of the tip of the workpiece, i.e. in the example shown, the start of the relief shifts further outward. If this is possible within the framework of the permitted tolerance, such a contact path can also be utilized here. If the worm is used for the rough machining and for the fine machining, it is thus also possible to use the offset contact paths only for rough machining and to use the ideal contact paths for fine machining; or only slightly shifted contact paths are used, in addition to the ideal contact paths, for fine machining and contact paths shifted by a greater amount for rough machining. It thereby becomes possible to use a wider strip per region and thus to have a greater active surface of the worm. It is also possible to dress a part of the worm in a non-modified manner to use this region for rough machining.

Non-Constant Modification Along the Contact Line

To reduce the deviations which arise with respect to the desired modification when the contact path is shifted with respect to the ideal contact path, it can be of advantage if the modification along the contact line between the dresser and the worm is not constant. By utilizing all the available degrees of freedom on the dressing of the worm, it is possible to produce a modification at least approximately linear or quadratic in w. The topological modification on the worm can then be written at least approximately as:

$$f_{Ft1}(w_{F1},z_{F1})=F_{Ft1C}(X_{F1})+F_{Ft1L}(X_{F1}) \cdot w_{F1}+F_{Ft1Q}(X_{F1}) \cdot w_{F1}^2. \tag{85}$$

Which axis corrections are required along the contact line given by $X_{F1}$ for achieving the desired linear or quadratic modification, can be determined, for example, by variation of the axis corrections and determination of the modification obtained in this manner iteratively using the above-described simulation.

The functions $F_{Ft1C}$, $F_{Ft1L}$ and $F_{Ft1Q}$ can be determined as follows: $F_{Ft1C}$ is determined as above for the case of constant modification along the contact line so that the modification on the workpiece is exactly achieved for a contact path. The functions $F_{Ft1L}$ and $F_{Ft1Q}$ are then determined, for example by means of curve fitting, such that the deviation from the desired modification arising on the workpiece is minimal for discrete shifted contact paths or for a band of contact paths. In this respect, the deviations can optionally be weighted differently in dependence on the generating path to take account of different tolerances along the profile. The distance of the shifted contact paths or the width of the band can be determined iteratively such that the deviation arising on the workpiece lies within the tolerance in all contact paths. In this respect, contact paths with a tighter tolerance can be determined for fine machining and regions with a greater tolerance can be determined for rough machining.

Application with Non-Involute Gearings

The method such as has previously been described can also be directly extended to non-involute gearings or profiles, wherein here the gearings can also again be asymmetrical and/or conical. In this respect, the linear relationships indicated above for involute gearings are generally not linear. The parameter $w_F$ here no longer corresponds to the generating path known from involute gearings, but rather, viewed more generally, to a parameter which parameterizes the profile of the gearing. However, with the indicated simulation as an alternative to the determination of the contact paths and with the mapping of points on the worm with points on the workpiece, they can also be determined with non-involute profiles. The contact line between the dresser and the worm and the modifications resulting on the worm can equally be determined by the above-described dressing simulation in dependence on the axis corrections during dressing. However, a non-linear relationship generally results here between $w_{F1}$ and $z_{F1}$ for the progression of the contact line which is then described by equation (24). As with involute profiles, a parameter $X_{F1}$ can also be introduced here which implicitly describes the position of the contact line via a function $b_X$ along the worm width:

$$b_X(w_{F1},z_{F1})=X_{F1} \tag{86}$$

This equation represents the generalization of equation (25). The topological modification in the normal direction applied to the worm can be described through the generalization of equation (1).

$$f_{Fn1}(w_{F1},z_{F1})=F_{Fn1}(b_X(w_{F1},z_{F1}))=F_{Fn1}(X_{F1}) \tag{87}$$

A $X_{F1}$ can thus also be calculated with respect to every parameter $w_{F2}$ on the workpiece such that the contact line to $X_{F1}$ intersects the contact path at the $w_{F1}$ which is associated with the parameter $w_{F2}$. The modification $F_{Fn1}$ on the worm can then be calculated from the modification $f_{Fn2}$ on the workpiece using this association.

$$F_{Fn1}(X_{F1})=-f_{Fn2}(w_{F2}) \tag{88}$$

Figure 4:
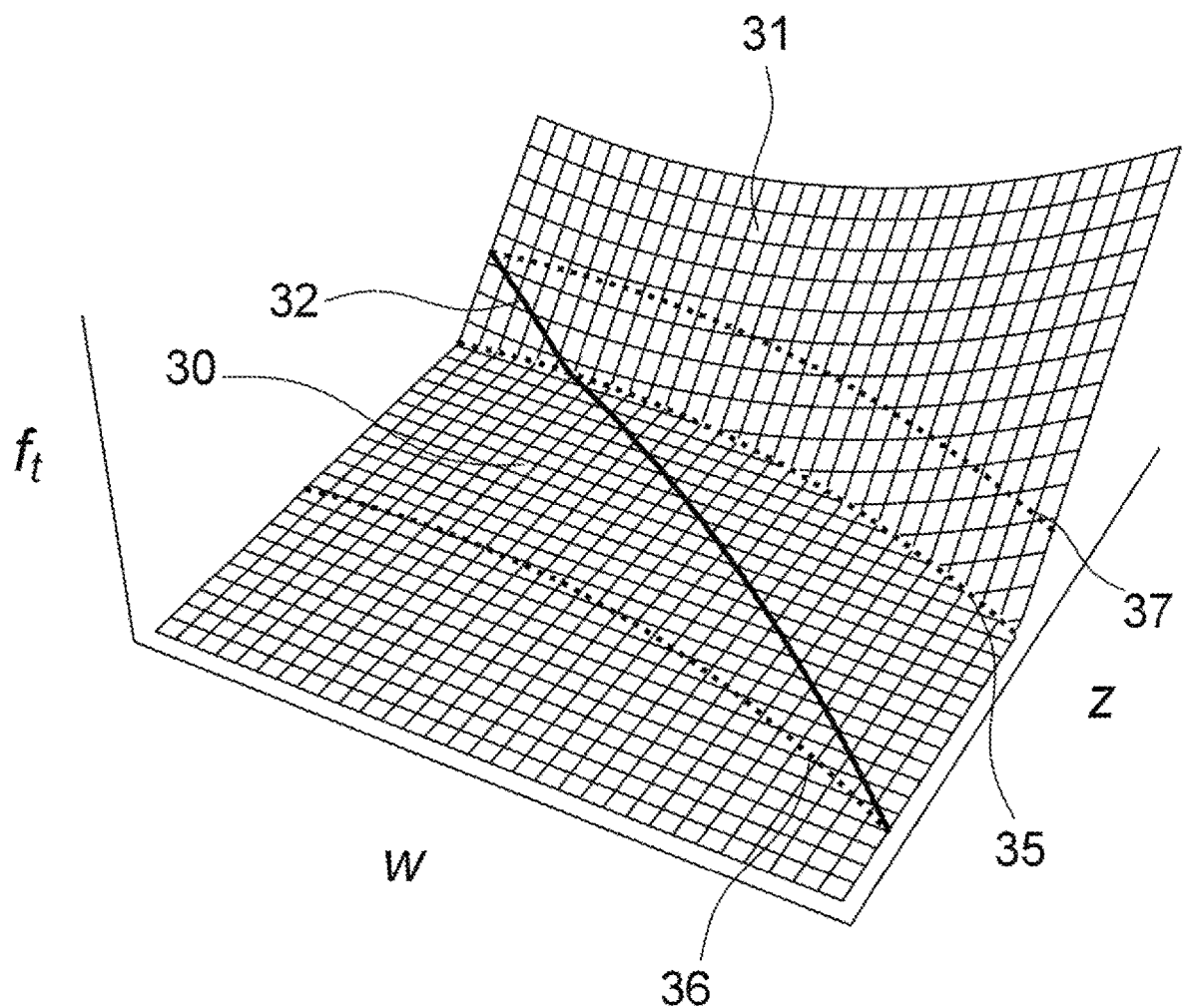
FIG. 4 shows by way of example the topological surface modification on a non-involute worm which is necessary to produce a linear tip relief on the workpiece with the method described here. 32 marks the contact path; 35, 36, and 37 indicate different contact lines between the dresser and the worm.

In contrast to the involute case, the modifications were considered in the normal section here. Since both the relationships and the contact path and the contact line can no longer be described by linear relationships, the associations have to be calculated numerically in general. FIG. 4 shows the contact line 35-37 for three different $X_{F1}$. The contact line is curved, unlike the involute case. The contact path 32 is also generally curved. The region 30 on the worm is not modified; the region 31 is modified.

Dressers for a Different Macrogeometry

A dresser always only matches one worm geometry mathematically exactly. If the macrogeometry of the worm is changed, in particular the number of threads and/or the diameter, the dresser no longer exactly matches and an unwanted profile error occurs during dressing. While a pure profile angle error can be corrected by an inward pivoting of the dresser in accordance with the prior art, other profile errors cannot be corrected. In involute gearings, for example, profile crownings thus inter alia arise when the dresser does not exactly match the worm to be dressed. Such profile errors could previously not be corrected and non-matching dressers could not be used. It is, however, now possible to correct the profile error arising due to the non-matching dresser using the method presented here. A profile modification is produced using the method for this purpose which results from the difference between the desired profile modification and the profile error arising due to the non-matching dresser. It is thereby possible make use of already available dressers more frequently and both investment costs for new dressers and waiting times up to the delivery of the dresser are dispensed with.

The problem of the non-matching dresser geometry is not only present when a dresser is to be used which was not designed for the worm to be dressed, but also when the worm diameter becomes smaller from dressing cycle to dressing cycle. In many cases, the profile errors resulting due to the changing worm diameter are so small that they are below the permitted tolerance. However, this no longer works when the ratio of worm diameter to module of the gearing to be ground becomes too small and/or when the number of threads is too large. Worms having small diameters can be used, for example, when generating grinding with a larger worm is no longer possible due to an interference contour. A further application is the grinding of large-module gearings. Since the worm diameters which can be used are upwardly limited, the ratio of worm diameter to the module reduces as the module increases. It is also possible to use worms having greater numbers of starts due to the capability of modern gear manufacturing machines to implement high table speeds.

If such worms are used, a dresser configured for the worm in a new state generates an unwanted profile defect for smaller radii, an unwanted profile crowning in the case of involute worms, if dressing takes place in accordance with a method of the prior art. If this profile error or this profile crowning is below a worm diameter outside the tolerance, the worm cannot be further dressed using the given dresser, whereby the maximum useful layer thickness is restricted. This problem has previously only been able to be solved by using different dressers for different diameter ranges. It is, however, possible with the method described here to keep the profile shape constant over a large diameter range with only one dresser. The dresser becomes a dresser not matching the worm for this purpose.

The invention claimed is:

1. A method of producing a workpiece having a desired profile modification by a generating method, wherein the workpiece is generating machined in at least one machining stroke by a tool having a modified gearing geometry, with the tool having a topological modification,
    wherein a contact path with the workpiece is not shifted on the tool during the machining stroke,
    wherein the generating method is carried out with the contact path with the workpiece being a defined contact path on the tool, and
    wherein at least one out of the topological modification of the tool and the defined contact path on the tool is selected so that the topological modification of the tool along the defined contact path on the tool has a shape so that it produces the desired profile modification on the workpiece.

2. The method in accordance with claim 1, wherein a cylindrical workpiece is machined and the machining takes place by an axial generating method.

3. The method in accordance with claim 1, wherein a conical workpiece is machined and the machining takes place by a diagonal generating method, with a diagonal ratio being selected so that the defined contact path on the tool does not shift during the machining stroke.

4. The method in accordance with claim 1, wherein the topological modification of the tool is of a surface geometry of the tool and has a constant value in a generating pattern at least locally in a first direction of the tool and is given by a function $F_{Ft1}$ in a second direction of the tool which extends perpendicular to the first direction.

5. The method in accordance with claim 1, wherein the desired profile modification on the workpiece is specified and is produced by the generating machining on the workpiece, and wherein one or more properties of the desired profile modification are specifiable, including at least one out of:
    a size of a crowning;
    a size of a profile angle deviation;
    an amount and position of a tip relief; and
    an amount and position of a root relief.

6. The method in accordance with claim 1, wherein the topological modification of the tool is produced in that a position of a dresser with respect to the tool during dressing of the tool is varied in dependence on an angle of rotation of the tool and/or on a tool width position.

7. The method in accordance with claim 1, wherein the topological modification of the tool is selected in dependence on the defined contact path on the tool, or the defined contact path on the tool is selected in dependence on the topological modification of the tool, or the topological modification of the tool and the defined contact path on the tool are selected with respect to each other so that the topological modification of the tool along the defined contact path on the tool has a shape so that it produces the desired profile modification on the workpiece.

8. The method in accordance with claim 1, the method comprising:
    specifying the desired profile modification on the workpiece;
    determining a modification of the tool along a defined contact path required for producing the desired profile modification on the workpiece;
    determining the topological modification of the tool which corresponds to the modification of the tool along the defined contact path; and/or determining a variation of a position of a dresser with respect to the tool during dressing of the tool suitable for providing the topological modification of the tool which corresponds to the modification of the tool along the defined contact path.

9. The method in accordance with claim 8, wherein, for the determination of the modification of the tool along the defined contact path required for producing the desired profile modification on the workpiece, a determination of contact points between the workpiece and the tool forming respective contact paths first takes place during the generating machining; and/or
    wherein, for the determination of the variation of the position of the dresser with respect to the tool suitable for providing the topological modification of the tool, a line of action of the dresser into the tool is determined in dependence on an angle of rotation of the tool and/or on a tool width position; wherein a direction of the line of action is assumed as constant for involute gearings; or wherein an influence of a modification on the direction of the line of action is taken into account for non-involute gearings.

10. The method in accordance with claim 1, wherein machining kinematics of a grinding process are modified during the generating machining while the contact path with the workpiece is not shifted on the tool to superpose a modification produced by a modification of the machining kinematics on the desired profile modification on the workpiece produced by the topological modification of the tool.

11. The method in accordance with claim 1, wherein a dresser having a modification is used for dressing the tool; and wherein a modification of the tool produced by the modification of the dresser has the topological modification of the tool superposed on it which is produced in that a position of the dresser with respect to the tool during dressing is varied in dependence on an angle of rotation of the tool and/or on a tool width position; with the topological modification of the tool being selected so that the superposition of the modifications on the tool along a selected contact path with the workpiece corresponds to a modification along the contact path required for producing the desired profile modification on the workpiece.

12. The method in accordance with claim 1 for manufacturing one or more workpieces having a desired gear geometry using a suitably dressed tool, wherein, after the carrying out of machining, the tool is respectively dressed before further machining is carried out at a same workpiece or at further workpieces, and
wherein, in a later dressing process, a different topological modification of the tool is produced with respect to an earlier dressing process.

13. The method in accordance with claim 1,
wherein, during a machining of one or more workpieces, at least one stroke is carried out with a first initial shift position of the tool and/or with a first contact path and at least one second stroke is carried out with a second initial shifted shift position of the tool and/or with a second, shifted contact path.

14. The method of claim 13, wherein the first initial shift position and the first contact path are shifted less with respect to an ideal initial shift position and to an ideal contact path than the second initial shifted shift position and the second, shifted contact path, with the first initial shift position corresponding to the ideal initial shift position and the first contact path corresponding to the ideal contact path; and/or wherein rough machining is carried out with the second initial shifted shift position and/or with the second, shifted contact path and fine machining is carried out with the first initial shift position and/or with the first contact path.

15. The method in accordance with claim 1, wherein the topological modification of the tool can be described at least approximately in a generating pattern at least locally in a first direction of the tool by a linear and/or quadratic function; wherein coefficients of the linear and/or quadratic functions are formed in a second direction of the tool which extends perpendicular to the first direction by coefficient functions $F_{FtC,1}$ for a constant portion, $F_{FtL,1}$ for a linear portion, and/or $F_{FtQ,1}$ for a quadratic portion.

16. The method of claim 15, wherein the coefficient function $F_{FtC,1}$ for the constant portion is determined so that the desired profile modification on the workpiece is exactly produced in the generating machining at a specified shift position and/or with a specified contact path; and wherein the coefficient function $F_{FtL,1}$ for the linear portion and/or the coefficient function $F_{FtQ,1}$ for the quadratic portion is/are determined so that a deviation from the desired profile modification on the workpiece is minimal which arises on the workpiece on the generating machining with at least one shifted initial shift position and/or contact path and/or at least one band or a range of initial shift positions and/or contact paths.

17. The method in accordance with claim 1, wherein the tool has at least one region having a first topological modification and a second region having a second topological modification, wherein the first topological modification along the contact path with the workpiece in a first initial shift position is identical to the second topological modification along the contact path with the workpiece in a second initial shift position;
wherein at least one stroke is carried out with the first initial shift position of the tool during a machining of one or more workpieces and at least one second stroke is carried out with the second initial shift position of the tool.

18. The method in accordance with claim 1, wherein a desired profile modification of the tool is specified and a modification of the tool suitable for production of the desired profile modification on the workpiece and/or a suitable variation of a position of a dresser with respect to the tool is determined during dressing in dependence on an angle of rotation of the tool and/or on a tool width position;
wherein the topological modification of the tool is determined along a contact line between the tool and the workpiece from the desired profile modification on the workpiece via an inverse of an association function which describes mapping of a surface of the tool to a surface of the workpiece during generating grinding with a specific contact path and a specific initial shift position of the tool.

19. The method in accordance with claim 1, wherein the tool is dressed in a modified manner by a profile roller dresser and/or a form roller dresser;
wherein the dressing takes place in line contact with the tool; and/or
wherein further the profile roller dresser and/or the form roller dresser is/are in contact with a tooth of the tool during the dressing from a root region to a tip region so that the topological modification of the tool takes place over a total tooth depth in one stroke;
or, alternatively,
wherein the profile roller dresser and/or the form roller dresser is/are in contact with the tooth of the tool only in part regions between the root region and the tip region during dressing so that a specific modification takes place over the total tooth depth in a plurality of strokes and at a respective different relative positioning of the profile roller dresser and/or the form roller dresser;
and/or wherein production of the topological modification of the tool takes place in that one or more corrections of axial movements with respect to conventional dressing kinematics are carried out, including at least one out of:
a) varying axial spacing of the dresser from the tool in dependence on an angle of rotation of the tool and/or on a tool width position (infeed);
b) varying an axial feed of the tool or of the dresser in dependence on the angle of rotation of the tool and/or on the tool width position (shift);
c) varying an axial cross angle of the tool and of the dresser in dependence on the angle of rotation of the tool and/or on the tool width position (pivot); and
d) varying a tool speed in dependence on the angle of rotation of the tool and/or on the tool width position;
and/or wherein the modified dressing of the tool takes place in that the dresser is fed in dependence on an angular position of the tool and/or on the tool width position or in that the tool is fed onto the dresser, or vice versa, in dependence on its angular position and/or on the tool width position;
and/or wherein at least three degrees of freedom, and four or five degrees of freedom, are used during the relative positioning between the dresser and the tool for producing the topological modification of the tool, with the degrees of freedom being settable independently of one another for producing the topological modification of the tool, and/or with it being a case of at least three, four, or all of the following five degrees of freedom: the angle of rotation of the tool; an axial position of the tool; a y position of the dresser; a center distance; and/or an axial cross angle, with the axial position of the tool being used to displace the contact line of the dresser, and with two, three, or four of the remaining four degrees of freedom being set independently of one another to produce a specified modification along the contact line.

20. The method of claim 19, wherein a first region in a first initial shift position and a second region in a second initial shift position each comprise a respective complete contact path with the workpiece;
and/or wherein a first topological modification of the tool is identical to a second topological modification of the tool.

21. A tool for carrying out the method in accordance with claim 1, wherein the tool has at least one first region having the topological modification of the tool, the topological modification of the tool being a first topological modification, and
wherein the tool has a second region having a second topological modification; wherein the first topological modification along the defined contact path with the workpiece at a first initial shift position is identical with the second topological modification along a second contact path with the workpiece at a second initial shift position of the workpiece.

22. A gear manufacturing machine for carrying out the method in accordance with claim 1, wherein the gear manufacturing machine comprises an input function via which the desired profile modification on the workpiece is specifiable, wherein the gear manufacturing machine has a determination function which determines the topological modification of the tool suitable for production of the desired profile modification on the workpiece and/or a suitable variation of a position of a dresser with respect to the tool during dressing in dependence on an angle of rotation of the tool and/or on a tool width position for producing the topological modification of the tool during dressing; and/or comprises a dressing function which, during the dressing of the tool, produces the topological modification of the tool suitable for the production of the desired profile modification on the workpiece.

23. An article of manufacture comprising a data carrier or memory, the data carrier or memory storing a computer program for carrying out the method in accordance with claim 1, the computer program being for installation on a gear manufacturing machine, and/or having an output function for data for use on the gear manufacturing machine, having an input function for inputting data on the desired profile modification on the workpiece and having a function for determining the topological modification of the tool suitable for production of the desired profile modification on the workpiece; and/or a suitable variation of a position of a dresser with respect to the tool during dressing in dependence on an angle of rotation of the tool and/or on a tool width position for producing the topological modification of the tool during dressing so that the desired profile modification on the workpiece can be produced by the generating machining with the tool having the topological modification with the contact path unchanged over the machining stroke, with the functions implementing the method in accordance with claim 1.

24. The article of manufacture in accordance with claim 23, wherein the input function allows for specification of the desired profile modification on the workpiece;
wherein at least one of the following properties of a profile modification is specifiable:
a size of a crowning;
a size of a profile angle deviation;
an amount and position of a tip relief; and
an amount and position of a root relief, and
wherein at least one input mask having input boxes is provided for at least one of the properties and/or for their data.

25. The method of claim 1, wherein the tool has a conical basic shape and the machining takes place on a right flank and a left flank, with a conical angle of the tool and a diagonal ratio further selected so that the contact path with the workpiece does not shift on the right and left flanks during two-flank machining.

26. A method of producing a workpiece having a modified gearing geometry by a generating method, wherein the workpiece is generating machining in at least one machining stroke by a tool having a modified gearing geometry, with the tool having a topological modification,
wherein a contact path with the workpiece is not shifted on the tool during the machining stroke, wherein a dresser is used for dressing the tool in line contact, where the dresser is designed for a tool having a different macrogeometry including a different diameter and/or a different number of threads; wherein a modification of a surface geometry of the tool at a selected contact path with the workpiece produced by a non-matching dresser is compensated in that a position of the dresser with respect to the tool during dressing is suitably varied in dependence on an angle of rotation of the tool and/or on a tool width position; and wherein the generating method is carried out using the selected contact path with the workpiece.

27. A method of producing a workpiece having a modified gearing geometry by a generating method, wherein the workpiece is generating machining in at least one machining stroke by a tool having a modified gearing geometry, with the tool having a topological modification,
wherein a contact path with the workpiece is not shifted on the tool during the machining stroke,
wherein the method is used for manufacturing a workpiece having a desired gearing geometry using a suitably dressed tool, the method comprising:
specifying a desired profile modification on the workpiece;
selecting a combination of a dresser and the tool from a plurality of combinations which produces smallest deviations from the desired profile modification on the workpiece without a modification of a dressing process;
performing a modified dressing of the tool with the dresser in line contact for producing the topological modification of the tool to compensate the deviations; and
machining the workpiece with the dressed tool with the contact path unchanged over the machining stroke to produce the desired profile modification on the workpiece, and
wherein the dressers and/or tools are an at least partly specified or already existing range.

* * * * *